(12) United States Patent
Hoshi et al.

(10) Patent No.: US 6,299,653 B1
(45) Date of Patent: Oct. 9, 2001

(54) HYBRID ELECTROLYTE, METHOD FOR MANUFACTURING THE SAME, AND METHOD FOR MANUFACTURING ELECTROCHEMICAL ELEMENT USING THE SAME

(75) Inventors: Nobuto Hoshi, Kurashiki; Masakatsu Kuroki, Fuji; Takashi Minakata, Ibara, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/202,480

(22) PCT Filed: Jun. 13, 1997

(86) PCT No.: PCT/JP97/02056

§ 371 Date: Dec. 14, 1998

§ 102(e) Date: Dec. 14, 1998

(87) PCT Pub. No.: WO97/48106

PCT Pub. Date: Dec. 18, 1997

(30) Foreign Application Priority Data

Jun. 13, 1996 (JP) .................................................. 8-152134
Apr. 17, 1997 (JP) .................................................. 9-100397

(51) Int. Cl.$^7$ ..................................................... H01M 6/00
(52) U.S. Cl. ...................... 29/623.1; 29/623.5; 29/623.3; 429/300; 429/303; 429/344
(58) Field of Search ............................... 29/623.1, 623.3, 29/623.5; 429/300, 303, 188, 344, 347, 324, 325

(56) References Cited

U.S. PATENT DOCUMENTS 5,693,432 * 12/1997 Matsumoto ........................ 429/192

FOREIGN PATENT DOCUMENTS

| 0 730 316 A1 | 4/1996 | (EP) . | |
| 1-158051 | 6/1989 | (JP) . | |
| 2-230662 | * 9/1990 | (JP) | ................ H01M/6/22 |
| 6-150939 | 5/1994 | (JP) . | |

* cited by examiner

Primary Examiner—Gabrielle Brouillette
Assistant Examiner—Raymond Alejandro
(74) Attorney, Agent, or Firm—Pennie & Edmonds LLP

(57) ABSTRACT

Disclosed is a hybrid electrolyte comprising a shaped porous polymer structure comprising a polymer matrix and a plurality of cells dispersed in the polymer matrix, the polymer matrix containing a crosslinked polymer segment and having a gel content in the range of from 20 to 75%, wherein the shaped porous polymer structure is impregnated and swelled with an electrolytic liquid. A method for producing the hybrid electrolyte and a method for producing an electrochemical device comprising the hybrid electrolyte are also disclosed. The hybrid electrolyte of the present invention has a high ionic conductivity, an excellent stability under high temperature conditions and an excellent adherability to an electrode. Further, by the method of the present invention, the hybrid electrolyte having the above-mentioned excellent properties and an electrochemical device comprising such a hybrid electrolyte can be surely and effectively produced.

33 Claims, No Drawings

HYBRID ELECTROLYTE, METHOD FOR MANUFACTURING THE SAME, AND METHOD FOR MANUFACTURING ELECTROCHEMICAL ELEMENT USING THE SAME

BACKGROUND OF THE INVENTION

1. Field of the Invention

The present invention relates to a novel hybrid electrolyte. More particularly, the present invention is concerned with a novel hybrid electrolyte comprising a shaped porous polymer structure comprising a polymer matrix and a plurality of cells dispersed in the polymer matrix, the polymer matrix containing a crosslinked polymer segment and having a specific gel content, wherein the shaped porous polymer structure is impregnated and swelled with an electrolytic liquid. The present invention is also concerned with a method for producing the hybrid electrolyte and a method for producing an electrochemical device comprising the hybrid electrolyte.

The hybrid electrolyte of the present invention has a high ionic conductivity, an excellent stability under high temperature conditions and an excellent adherability to an electrode, so that the hybrid electrolyte of the present invention can be advantageously used as an electrolyte for various electrochemical devices, such as primary and secondary batteries (e.g., a lithium battery), a photoelectrochemical device and an electrochemical sensor. Further, by the method of the present invention, the hybrid electrolyte having the above-mentioned excellent properties and an electrochemical device comprising the same can be surely and effectively produced.

2. Prior Art

Recently, for reducing the size and weight of portable equipments, such as pocket telephones and personal computers, there has been a demand for a battery having high energy density. As a battery for meeting such a demand, lithium ion batteries have been developed. This type of battery has a structure in which a porous separator is disposed between the positive and negative electrodes, wherein the porous separator is not swelled with an electrolytic liquid. For preventing a leakage of the electrolytic liquid used for impregnating the separator, the commercially produced battery of this type has a battery structure wholly packaged in a very strong metallic casing having a large thickness.

On the other hand, so-called solid type batteries produced using a solid electrolyte functioning not only as an electrolyte but also as a separator are advantageously free from the danger of leakage of an electrolytic liquid. Therefore, it is expected that not only is a solid electrolyte useful for providing a battery having improved reliability and safety, but is also advantageous in that both the lamination of a solid electrolyte onto electrodes and the packaging of the resultant laminate to form a battery can be easily performed, wherein the thickness and weight of the battery can be reduced. Especially, a polymeric solid electrolyte comprising an ion-conductive polymer has excellent flexibility for processing and, therefore, not only can a laminate structure composed of the polymeric solid electrolyte and electrodes be easily produced, but also the polymeric solid electrolyte is capable of changing its morphology at an interface between the electrolyte and the electrodes in accordance with the volumetric change of the electrodes caused by the occlusion and release of ions by the electrodes, enabling the interface of the polymeric solid electrolyte to intimately fit over the electrodes without suffering delamination from the electrodes.

As such a polymeric solid electrolyte, an alkali metal salt complex of polyethylene oxide was proposed by Wright in British Polymer Journal, vol.7, p.319 (1975). Since then, researches on various skeletal materials for polymeric solid electrolytes have been energetically conducted. Examples of such skeletal materials include polyethers, such as polyethylene oxide and polypropylene oxide, polyphosphazene and polysiloxane. Generally, polymeric solid electrolytes are provided in the form of solid solutions of a solid electrolyte in a polymeric solid, wherein the solid electrolyte is considered to be uniformly dissolved in the polymeric solid, and are known as dry type polymeric solid electrolytes. However, these polymeric solid electrolytes have a problem in that the ionic conductivity of them is extremely low as compared to that of an electrolytic liquid. Therefore, a battery produced using such a polymeric solid electrolyte has problems in that it has a low charge/discharge current density and has a high resistance.

For solving these problems, various attempts to improve the ionic conductivity of a polymeric solid electrolyte have been proposed, wherein the condition of the solid electrolyte is rendered similar to the condition of the electrolyte in the electrolytic liquid. For example, gelled solid electrolytes are known which are obtained by adding a solvent for the electrolyte (which solvent is capable of dissolving an electrolyte to form an electrolytic liquid) as a plasticizer to a polymer matrix so that the solvent and the polymer matrix together form a gel, wherein the solvent is used for increasing the dissociation of the electrolyte and promoting the molecular movement of the polymer, so that the ionic conductivity of the electrolyte can be increased (see, for example, Japanese Patent Application Laid-Open Specification No. 57-143356). As an example of such a gelled solid electrolyte, U.S. Pat. No. 5,296,318 discloses a gelled solid electrolyte obtained by adding an electrolytic liquid to a vinylidene fluoride polymer so that the electrolytic liquid and the polymer together form a gel. Further, U.S. Pat. No. 5,429,891 discloses a gelled solid electrolyte obtained by adding an electrolytic liquid to a crosslinked vinylidene fluoride polymer to thereby swell the crosslinked polymer so that the electrolytic liquid and the crosslinked polymer together form a gel. In general, when a battery comprising such a gelled solid electrolyte (i.e., a so-called hybrid electrolyte) is produced, a hybrid electrolyte comprising a crosslinked polymer swelled with an electrolytic liquid is produced, and then, a battery is assembled using the swelled hybrid electrolyte, electrodes, etc. With respect to the polymer matrix of such a hybrid electrolyte, a crosslinked polymer can be used. On the other hand, a method for producing a battery comprising a hybrid electrolyte layer is also known, wherein the hybrid electrolyte layer is formed by coating electrodes for the battery with a solution obtained by dissolving a non-crosslinked polymer, an electrolyte and a plasticizer in a low boiling point solvent, followed by removing the solvent by evaporation (see U.S. Pat. No. 5,296,318). Each of these materials is electrochemically stable and has a high ionic conductivity, as compared to that of a conventional dry type solid electrolyte. However, the ionic conductivity of each of the above-mentioned hybrid electrolytes is still unsatisfactory, as compared to that of an electrolytic liquid. Further, a non-porous polymer matrix is used for each of the above-mentioned conventional hybrid electrolytes. Hence, the capacities of the batteries comprising such conventional hybrid electrolytes are disadvantageously low.

As a hybrid electrolyte having a high ionic conductivity, a material has been proposed, which comprises a gel phase (comprising a polymer and an electrolytic liquid) and a liquid phase (comprising an electrolytic liquid), wherein the liquid phase is dispersed in the gel phase. For example, Unexamined Japanese Patent Application Laid-Open Specification No 8-250127 describes the use of a vinylidene fluoride porous polymer sheet as a polymer matrix of a solid electrolyte. In this document, a description is made with respect to a method for impregnating a porous polymer sheet with an electrolytic liquid under high temperature conditions, to thereby form a hybrid electrolyte (comprising the porous polymer sheet impregnated and swelled with the electrolytic liquid), which is similar to the hybrid electrolyte of the present invention. Further, Unexamined Japanese Patent Application Laid-Open Specification No. 6-150939 discloses a method for producing a hybrid (solid) electrolyte, in which a porous structure comprising a crosslinked polymer containing polar units is used as a matrix for the hybrid (solid) electrolyte. However, in the method described in these documents, in order to retain an electrolytic liquid in the matrix, a crosslinked porous polymer sheet as the matrix is immersed in an excess amount of an electrolytic liquid under conditions at which a non-crosslinked polymer segment contained in the crosslinked porous polymer sheet can be dissolved in the electrolytic liquid. In the hybrid electrolyte thus obtained, the non-crosslinked polymer segment contained in the crosslinked porous polymer sheet (which segment is capable of imparting the resultant electrolyte with an adherability to electrodes) is dissolved into the electrolytic liquid during the immersion, so that the adherence strength of the resultant electrolyte to electrodes disadvantageously becomes low.

Further, Unexamined Japanese Patent Application Laid-Open Specification No. 8-195220 discloses a method for producing a hybrid electrolyte comprising a porous polymer matrix, which comprises dispersing a non-crosslinked polyacrylonitrile in an electrolytic liquid to thereby obtain a dispersion; coating a stainless steel substrate with the obtained dispersion and heating the dispersion coated on the stainless steel substrate to dissolve the non-crosslinked polyacrylonitrile (which is contained in the dispersion coated on the stainless steel substrate) into the electrolytic liquid, to thereby form a homogeneous solution; cooling the thus formed solution on the stainless steel substrate to thereby form a hybrid electrolyte layer comprising a polymer matrix comprising the non-crosslinked polyacrylonitrile and the electrolytic liquid retained in the polymer matrix; and pricking holes in the hybrid electrolyte layer (by means of a thin stainless needle) in a condition where the hybrid electrolyte layer is immersed in a solution of an electrolyte, so that the polymer matrix of the hybrid electrolyte layer is rendered porous, to thereby obtain a hybrid electrolyte comprising the porous polymer matrix and the electrolytic liquid contained therein. However, in this method, it is required to dissolve a polyacrylonitrile into an electrolytic liquid and, therefore, it is required to use a non-crosslinked polyacrylonitrile. Further, in this method, it is difficult to introduce a crosslinked structure into the polyacrylonitrile constituting the polymer matrix of the hybrid electrolyte obtained by this method Therefore, the non-crosslinked polyacrylonitrile constituting the porous polymer matrix of the hybrid electrolyte is likely to be dissolved into the electrolytic liquid or fused under high temperature conditions, so that there is disadvantageously a danger that the hybrid electrolyte obtained by this method suffers distortion, thereby causing shutting or short-circuiting of the pores of the hybrid electrolyte.

Further, each of the above-mentioned various types of hybrid electrolytes is constructed with a polymer which is already swelled with an electrolytic liquid, so that the mechanical strength of the electrolyte is disadvantageously low and, hence, it is not easy to handle the hybrid electrolyte for laminating the hybrid electrolyte onto electrodes in the assembling of a battery. In particular, it is extremely difficult to produce the above-mentioned hybrid electrolyte in the form of a thin sheet so as to increase the energy density of the hybrid electrolyte. With respect to the method comprising coating an electrolyte with a solution of a polymer and an electrolyte in a solvent, the handling of the electrolyte is easy However, from the viewpoint of safety, this method is not preferred because a low boiling point solvent which is combustible, such as THF, is used.

On the other hand, an attempt to prevent the electrolytic liquid in a solid electrolyte from leakage has been proposed, wherein a liquid ion conductor is filled in the pores of a porous polymer sheet of the solid electrolyte so that it can be retained in the porous polymer sheet by the capillary action. For example, a microporous polymer sheet made of a material having a high mechanical strength, such as a polyolefin, and having a through-hole diameter of 0.1 mm or less is provided, and the pores of the microporous polymer sheet are filled up with an ion transferring medium to thereby form a thin electrolyte sheet (Unexamined Japanese Patent Application Laid-Open Specification No. 1-158051). With respect to the solid electrolyte of this type, the mechanical strength is large; however, a large number of pores in the microporous polymer sheet form complicated labyrinthian passages and, therefore, ions have to pass through the electrolytic liquid phase in such complicated labyrinthian passages, so that the above-mentioned solid electrolyte has a defect in that the ionic conductivity thereof is disadvantageously low.

SUMMARY OF THE INVENTION

In this situation, the present inventors have made extensive and intensive studies toward developing a hybrid electrolyte which is free from difficult problems accompanying the above-mentioned prior art techniques and has not only a high ionic conductivity, but also an excellent stability under high temperature conditions and an excellent adherability to an electrode, and a method for surely and effectively producing the hybrid electrolyte and an electrochemical device, such as a battery, comprising the hybrid electrolyte. As a result, it has unexpectedly been found that a hybrid electrolyte, which comprises a shaped porous polymer structure comprising a polymer matrix and a plurality of cells dispersed in the polymer matrix, wherein the polymer matrix contains a crosslinked polymer segment and has a gel content in the range of from 20 to 75%, and wherein the polymer matrix is impregnated and swelled with an electrolytic liquid selected from the group consisting of a solution of an electrolyte in water or a non-aqueous solvent and a liquid electrolyte, exhibits a high ionic conductivity, an excellent stability under high temperature conditions and an excellent adherability to an electrode.

Further, it has also been found that the above-mentioned hybrid electrolyte can be surely and effectively produced by a method which comprises impregnating the above-mentioned shaped porous polymer structure with the above-mentioned electrolytic liquid under predetermined non-swelling temperature and pressure conditions at which the shaped porous polymer structure is substantially insusceptible to swelling with the electrolytic liquid, thereby obtaining an impregnated, shaped porous polymer structure; and holding the impregnated, shaped porous polymer structure under predetermined swelling temperature and pressure conditions at which the shaped porous polymer structure is susceptible to swelling with the electrolytic liquid.

Still further, it has unexpectedly been found that an electrochemical device comprising the above-mentioned hybrid electrolyte can be surely and effectively produced by a method which comprises impregnating the above-mentioned shaped porous polymer structure with the above-mentioned electrolytic liquid under predetermined non-swelling temperature and pressure conditions at which the shaped porous polymer structure is substantially insusceptible to swelling with the electrolytic liquid, thereby obtaining an impregnated, shaped porous polymer structure; laminating the impregnated, shaped porous polymer structure to an electrode to thereby obtain a laminate structure; and holding the laminate structure under predetermined swelling temperature and pressure conditions at which the shaped porous polymer structure is susceptible to swelling with the electrolytic liquid.

Furthermore, it has unexpectedly been found that an electrochemical device comprising the above-mentioned hybrid electrolyte can be surely and effectively produced by a method which comprises laminating the above-mentioned shaped porous polymer structure to an electrode to thereby obtain a laminate structure; impregnating the laminate structure with the above-mentioned electrolytic liquid under predetermined non-swelling temperature and pressure conditions at which the shaped porous polymer structure is substantially insusceptible to swelling with the electrolytic liquid; and holding the impregnated laminate structure under predetermined swelling temperature and pressure conditions at which the shaped porous polymer structure is susceptible to swelling with the electrolytic liquid.

The present-invention is completed based on the above-mentioned findings.

Therefore, it is an object of the present invention to provide a hybrid electrolyte which exhibits a high ionic conductivity, an excellent stability under high temperature conditions and an excellent adherability to an electrode.

It is another object of the present invention to provide a method for surely and effectively producing a hybrid electrolyte having the above-mentioned properties.

It is still another object of the present invention to provide a method for surely and effectively producing an electrochemical device, such as a battery, comprising a hybrid electrolyte having the above-mentioned properties.

The foregoing and other objects, features and advantages of the present invention will be apparent to those skilled in the art from the following detailed description and appended claims.

DETAILED DESCRIPTION OF THE INVENTION

In an essential aspect of the present invention, there is provided a hybrid electrolyte which comprises a shaped porous polymer structure comprising a polymer matrix and a plurality of cells dispersed in the polymer matrix, the polymer matrix containing a crosslinked polymer segment and having a gel content in the range of from 20 to 75%; and an electrolytic liquid selected from the group consisting of a solution of an electrolyte in water or a non-aqueous solvent and a liquid electrolyte, wherein the shaped porous polymer structure is impregnated and swelled with the electrolytic liquid.

For easy understanding of the present invention, the essential features and various embodiments of the present invention are enumerated below.

1. A hybrid electrolyte comprising:
    a shaped porous polymer structure comprising a polymer matrix and a plurality of cells dispersed in the polymer matrix, the polymer matrix containing a crosslinked polymer segment and having a gel content in the range of from 20 to 75%, and
    an electrolytic liquid selected from the group consisting of a solution of an electrolyte in water or a non-aqueous solvent and a liquid electrolyte,
    wherein the shaped porous polymer structure is impregnated and swelled with the electrolytic liquid
2. The hybrid electrolyte according to item 1 above, wherein the polymer matrix has a gel content in the range of from 30 to 70% by weight.
3. The hybrid electrolyte according to item 1 above, wherein the polymer matrix has a gel content in the range of from 35 to 65% by weight
4. The hybrid electrolyte according to any one of items 1 to 3 above, wherein the cells of the polymer matrix comprise open cells which form through-holes passing through the shaped porous polymer structure.
5. The hybrid electrolyte according to any one of items 1 to 4 above, wherein the shaped porous polymer structure has a void ratio of from 30 to 95%.
6. The hybrid electrolyte according to any one of items 1 to 5 above, which is in the form of a sheet having a thickness of from 1 to 500 $\mu$m.
7. The hybrid electrolyte according to any one of items 1 to 6 above, wherein the polymer matrix comprises a vinylidene fluoride polymer or an acrylonitrile polymer.
8. The hybrid electrolyte according to any one of items 1 to 7 above, wherein the crosslinked polymer segment has a crosslinked structure formed by electron beam irradiation or $\gamma$-ray irradiation.
9. A method for producing a hybrid electrolyte, which comprises:
    impregnating a shaped porous polymer structure, which comprises a polymer matrix and a plurality of cells dispersed in the polymer matrix, wherein the polymer matrix contains a crosslinked polymer segment, with an electrolytic liquid selected from the group consisting of a solution of an electrolyte in water or a non-aqueous solvent and a liquid electrolyte under predetermined non-swelling temperature and pressure conditions at which the shaped porous polymer structure is substantially insusceptible to swelling with the electrolytic liquid, thereby obtaining an impregnated, shaped porous polymer structure; and
    holding the impregnated, shaped porous polymer structure under predetermined swelling temperature and pressure conditions at which the shaped porous polymer structure is susceptible to swelling with the electrolytic liquid.
10. The method according to item 9 above, wherein the cells of the polymer matrix comprise open cells which form through-holes passing through the shaped porous polymer structure.
11. The method according to item 9 or 10 above, wherein the polymer matrix comprises a vinylidene fluoride polymer or an acrylonitrile polymer.
12. The method according to any one of items 9 to 11 above, wherein the electrolytic liquid is selected from the group consisting of a solution of an electrolyte in a non-aqueous solvent and a liquid electrolyte.
13. A method for producing a hybrid electrolyte, which comprises:

impregnating a shaped porous polymer structure, which comprises a polymer matrix and a plurality of cells dispersed in the polymer matrix, wherein the polymer matrix comprises a vinylidene fluoride polymer or an acrylonitrile polymer and contains a crosslinked polymer segment, with an electrolytic liquid selected from the group consisting of a solution of an electrolyte in a non-aqueous solvent and a liquid electrolyte at a temperature of 35° C. or less under atmospheric pressure, thereby obtaining an impregnated, shaped porous polymer structure; and heating the impregnated, shaped porous polymer structure at a temperature of 80° C. or more under atmospheric pressure.

14. The method according to item 13 above, wherein the cells of the polymer matrix comprise open cells which form through-holes passing through the shaped porous polymer structure.

15. The method according to item 13 or 14 above, wherein the impregnated, shaped polymer structure is heated at a temperature of 90° C. or more.

16. A hybrid electrolyte which is substantially the same as that produced by the method of any one of claims 9 to 15.

17. A method for producing an electrochemical device, which comprises:

impregnating a shaped porous polymer structure, which comprises a polymer matrix and a plurality of cells dispersed in the polymer matrix, wherein the polymer matrix contains a crosslinked polymer segment, with an electrolytic liquid selected from the group consisting of a solution of an electrolyte in water or a non-aqueous solvent and a liquid electrolyte under predetermined non-swelling temperature and pressure conditions at which the shaped porous polymer structure is substantially insusceptible to swelling with the electrolytic liquid, thereby obtaining an impregnated, shaped porous polymer structure;

laminating the impregnated, shaped porous polymer structure to an electrode to thereby obtain a laminate structure; and holding the laminate structure under predetermined swelling temperature and pressure conditions at which the shaped porous polymer structure is susceptible to swelling with the electrolytic liquid.

18. The method according to item 17 above, wherein the polymer matrix comprises a vinylidene fluoride polymer or an acrylonitrile polymer.

19. A method for producing an electrochemical device, which comprises:

impregnating a shaped porous polymer structure, which comprises a polymer matrix and a plurality of cells dispersed in the polymer matrix, wherein the polymer matrix comprises a vinylidene fluoride polymer or an acrylonitrile polymer and contains a crosslinked segments, with an electrolytic liquid selected from the group consisting of a solution of an electrolyte in a non-aqueous liquid and a liquid electrolyte at a temperature of 35° C. or less under atmospheric pressure, thereby obtaining an impregnated, shaped porous polymer structure;

laminating the impregnated, shaped porous polymer structure to an electrode to thereby obtain a laminate structure; and heating the laminate structure at a temperature of 80° C. or more under atmospheric pressure.

20. The method according to item 19 above, wherein the laminate structure is heated at 90° C. or more.

21. A method for producing an electrochemical device, which comprises:

laminating a shaped porous polymer structure, which comprises a polymer matrix and a plurality of cells dispersed in the polymer matrix, wherein the polymer matrix contains a crosslinked polymer segment, to an electrode to thereby obtain a laminate structure;

impregnating the laminate structure with an electrolytic liquid selected from the group consisting of a solution of an electrolyte in water or a non-aqueous solvent and a liquid electrolyte under predetermined non-swelling temperature and pressure conditions at which the shaped porous polymer structure is substantially insusceptible to swelling with the electrolytic liquid, thereby obtaining an impregnated laminate structure; and holding the impregnated laminate structure under predetermined swelling temperature and pressure conditions at which the shaped porous polymer structure is susceptible to swelling with the electrolytic liquid.

22. The method according to item 21 above, wherein the polymer matrix comprises a vinylidene fluoride polymer or an acrylonitrile polymer.

23. A method for producing an electrochemical device, which comprises:

laminating a shaped porous polymer structure, which comprises a polymer matrix and a plurality of cells dispersed in the polymer matrix, wherein the polymer matrix comprises a vinylidene fluoride polymer or an acrylonitrile polymer and contains a crosslinked polymer segment, to an electrode to thereby obtain a laminate structure;

impregnating the laminate structure with an electrolytic liquid selected from the group consisting of a solution of an electrolyte in a non-aqueous solvent and a liquid electrolyte at a temperature of 35° C. or less under atmospheric pressure, thereby obtaining an impregnated laminate structure; and heating the impregnated laminate structure at a temperature of 80° C. or more under atmospheric pressure.

24. The method according to item 23 above, wherein the impregnated laminate structure is heated at a temperature of 90° C. or more.

25. The method according to any one of items 17 to 24 above, wherein the electrochemical device is a battery comprising a positive electrode and a negative electrode.

26. The method according to item 25 above, wherein the battery is a non-aqueous battery.

27. The method according to item 26 above, wherein the battery is a lithium ion secondary battery 28. The method according to any one of items 17 to 27 above, wherein the electrochemical device has an electrode having a current collector and wherein the current collector is a mesh current collector.

29. An electrochemical device, which is substantially the same as that produced by the method of any one of items 17 to 28 above.

The hybrid electrolyte of the present invention has intermediate properties as between a dry type solid electrolyte (containing no liquid) and a conventional liquid electrolyte (i.e., an electrolytic liquid obtained by dissolving an electrolyte in water or a non-aqueous solvent). That is, the hybrid electrolyte of the present invention is a polymeric solid electrolyte containing a solvent, preferably a high boiling point solvent, in a large amount, wherein it is free from a danger that the polymer moiety of the electrolyte does not flow out from the electrolyte as a solution of the polymer in the solvent. The hybrid electrolyte of the present invention assumes a gel form despite containing an electrolytic liquid in a large amount, so that the retention of the electrolytic liquid in the solid electrolyte is increased. More specifically, the hybrid electrolyte of the present invention is a hybrid electrolyte which comprises a shaped porous polymer structure comprising a polymer matrix and a plurality of cells dispersed in the polymer matrix, the polymer matrix containing a crosslinked polymer segment and having a gel content in the range of from 20 to 75%; and an electrolytic liquid selected from the group consisting of a solution of an electrolyte in water or a non-aqueous solvent and a liquid electrolyte, wherein the shaped porous polymer structure is impregnated and swelled with the electrolytic liquid.

Hereinbelow, a description is made with respect to the term "swelling" in the present invention. In general, when a crosslinked polymer is swelled with an excess amount of a solvent or solution, the volume of the polymer is drastically increased. In many cases, the resultant swelled, crosslinked polymer is expanded in all directions. However, when the crosslinked polymer has sustained a stress due, for example, to a stretching, the stress is relieved by the swelling and, in some specific directions, it is sometimes possible for the crosslinked polymer to shrink by the swelling. In any case, when a crosslinked polymer is swelled with an excess amount of a solvent or solution, the crosslinked polymer is likely to suffer large dimensional change. In the present invention, after immersing the shaped porous polymer structure in an electrolytic liquid under predetermined temperature and pressure conditions (wherein the volume of the electrolytic liquid is 100 times or more as large as the volume of the outer profile of the shaped porous polymer structure), the change (%) in the longitudinal length of the shaped porous polymer structure, relative to the longitudinal length measured before the immersion, is determined. If the change exceeds 10%, the shaped porous polymer structure is defined as being susceptible to swelling with the electrolytic liquid under the above-mentioned predetermined conditions.

On the other hand, whether or not the shaped porous polymer structure of a produced hybrid electrolyte has been impregnated and swelled with an electrolytic liquid, can be determined by a method in which the impregnated electrolytic liquid is removed from the produced hybrid electrolyte by extraction, followed by drying at room temperature to obtain the shaped porous polymer structure, and the degree of shrinkage of the obtained shaped porous polymer structure is determined. Specifically, in the present invention, the degree of shrinkage of a shaped porous polymer structure is obtained as follows. A produced hybrid electrolyte is immersed in a solvent, which is capable of extracting the electrolytic liquid but not capable of dissolving the polymer matrix, for 30 minutes or more to thereby extraction-remove the impregnated electrolytic liquid from the hybrid electrolyte, followed by drying in vacuum to thereby obtain a dried polymer matrix. The change in the longitudinal length of the above-obtained dried polymer matrix (shaped porous polymer structure), relative to the longitudinal length of the electrolytic liquid-impregnated hybrid electrolyte, is determined. This change (%) is defined as the degree of shrinkage of the shaped porous polymer structure. In the present invention, the hybrid electrolyte, which exhibits the above-defined degree of shrinkage of the shaped porous polymer structure of more than 10%, is defined as being impregnated and swelled with an electrolytic liquid.

In general, a hybrid electrolyte, which is used as an electrolyte for the so-called polymer battery (i.e., a battery comprising a solid electrolyte containing a polymer), is in the form of a sheet or the like. In this case, it is difficult to mechanically keep the hybrid electrolyte in contact with electrodes and, therefore, the hybrid electrolyte is required to be adhered to electrodes. The hybrid electrolyte is generally adhered to electrodes by heating the hybrid electrolyte to a temperature in the range of from approximately 50 to 200° C. (or, some specific types of hybrid electrolytes are adhered to electrodes at room temperature) under a pressure in the range of from 0.1 to 20 kg/cm$^2$. In connection with this adhesion, when the hybrid electrolyte is adhered to electrodes by heating, a portion of the polymer used in the hybrid electrolyte may be melted so as to function as an adhesive. The adherability of the hybrid electrolyte to the electrode varies, as described below, depending on the gel content of a polymer matrix of the shaped porous polymer structure in the hybrid electrolyte, wherein the polymer matrix contains a crosslinked polymer segment.

The polymer matrix in the hybrid electrolyte of the present invention is required to have a gel content in the range of from 20 to 75%, wherein the upper limit of the gel content is preferably 70%, more preferably 65%, and the lower limit of the gel content is preferably 30%, more preferably 35%. When the gel content of the hybrid electrolyte is more than 75%, it is difficult to adhere the hybrid electrolyte to electrodes by heating, so that the adherence strength of the hybrid electrolyte to the electrodes is disadvantageously lowered. On the other hand, when the gel content of the hybrid electrolyte is less than 20%, the thermal stability of the hybrid electrolyte becomes low, so that the hybrid electrolyte is likely to suffer distortion during the heating.

As described above, the hybrid electrolyte of the present invention comprises a shaped porous polymer structure comprising a polymer matrix and a plurality of cells dispersed in the polymer matrix, the polymer matrix being impregnated and swelled with an electrolytic liquid. The electrolytic liquid is present not only in the polymer matrix of the shaped porous polymer structure but also in the plurality of cells. The polymer matrix of the shaped porous polymer structure contains a crosslinked polymer segment which is introduced into the polymer by an appropriate crosslinking treatment. There is no limitation with respect to the type of the above-mentioned polymer to be subjected to the crosslinking treatment, as long as, after the crosslinking treatment, the polymer can be swelled with an electrolytic liquid. It is preferred that the polymer is electrochemically stable and exhibits a high ion-conductivity. Examples of such polymers include a poly(ethylene oxide), a polypropylene oxide, a vinylidene fluoride polymer, an acrylonitrile polymer, an oligo(ethylene oxide) poly(meth)acrylate, a poly(ethylene imine), a poly alkylene sulfide, a polyphosphazene and a polysiloxane each having an oligo(ethylene oxide) side chain, polymers each having ionic groups in the molecule, such as Nation (manufactured and sold by Du Pont, U.S.A.), Flemion (manufactured and sold by Asahi Glass Co., Ltd., Japan) and the like. A vinylidene fluoride polymer and an acrylonitrile polymer include not only a homopolymer but also a copolymer. For example, a vinylidene fluoride-hexafluoropropylene copolymer, a vinylidene fluoride-trifluoroethylene copolymer, an acrylonitrile-(meth)acrylate copolymer, an acrylonitrile-styrene copolymer and the like can also be used. When a polymer having ionic groups in the molecule is used for producing a lithium ion battery, each of the ionic groups is preferably in the form of a lithium salt. Among these polymers, a vinylidene fluoride polymer, such as a poly (vinylidene fluoride), a vinylidene fluoride-hexafluoropropylene copolymer or the like, and an acrylonitrile polymer, such as polyacrylonitrile, an acrylonitrile-(meth)acrylate copolymer, an acrylonitrile-styrene copolymer or the like are preferred, due to the high ionic conductivity and excellent mechanical strength thereof. A vinylidene fluoride polymer is more preferred.

The polymer is subjected to a crosslinking treatment and converted to a polymer containing a crosslinked polymer segment. Introduction of the crosslinked structure into the polymer enhances the stability of a hybrid electrolyte under high temperature conditions. If the polymer is not crosslinked, when a battery comprising the hybrid electrolyte experiences high temperature conditions, the performance of the battery is likely to irreversibly change, or occasionally, a short-circuiting of the battery occurs due to the melting of the polymer. The introduction of the crosslinked structure can be conducted at any stage, for example, during polymerization, or before or after the shaping of a polymer for producing the shaped porous polymer structure. The crosslinked structure can be introduced into a shaped porous polymer structure which is swelled with an electrolytic liquid, a plasticizer and the like. Examples of methods for crosslinking treatment include a method in which a crosslinked structure is formed by conducting the polymerization of the monomer (and comonomer) in the presence of an additional multifunctional monomer; a method in which a crosslinked structure is formed by the irradiation of a radiation energy, such as electron beams, γ-rays, X-rays, ultraviolet rays or the like after polymerization; and a method in which a crosslinked structure is formed by introducing a radical initiator into a polymer after the polymerization for producing the polymer, and heating or irradiating (with radiation energy) the polymer containing the radical initiator, to thereby effect a reaction for crosslinking. When the introduction of the crosslinked structure into the polymer is conducted after the polymerization for producing the polymer, it can be conducted in the presence of monofunctional and/or multifunctional monomer(s) which is/or are newly added. Among these methods for crosslinking treatment, from a viewpoint of decreasing the amount of any remaining impurities or unreacted functional groups, a method in which a crosslinked structure is formed by the irradiation of a radiation energy, such as electron beams, γ-rays, X-rays, ultraviolet rays or the like after polymerization is preferred. Further, it is more preferred that the radiation energy is electron beams or γ-rays.

By the above-mentioned crosslinking treatment, a crosslinked polymer segment is introduced into the polymer, so that a polymer containing a crosslinked polymer segment is obtained. With respect to the shaped porous polymer structure comprising a polymer matrix containing a crosslinked polymer segment formed by the above-mentioned crosslinking treatment, even if the shaped porous polymer structure is immersed in an excess amount of the electrolytic liquid under conditions at which a polymer, if not crosslinked, would be completely dissolved into the electrolytic liquid, dissolution of the whole of the shaped porous polymer structure into the electrolytic liquid does not occur, but only swelling of the shaped porous polymer structure with the electrolytic liquid occurs. The degree of crosslinking of the polymer of the polymer matrix is represented by the gel content, which is obtained from the weight difference of the polymer matrix before and after the extraction-treatment of the polymer matrix with a good solvent for a polymer matrix which is not crosslinked. In this connection, it should be noted that, depending on the conditions at which the shaped porous polymer structure is impregnated and swelled with an electrolytic liquid for producing a hybrid electrolyte, it is possible that the gel content of the polymer matrix of the hybrid electrolyte is different from the gel content of the polymer matrix of the shaped porous polymer structure before being swelled with the electrolytic liquid. Therefore, it is necessary to determine the gel content of the polymer matrix with respect to the polymer matrix obtained from the hybrid electrolyte.

An example of the method for determining the gel content of a polymer matrix of a hybrid electrolyte is as follows. That is, a produced hybrid electrolyte sheet impregnated and swelled with an electrolytic liquid is immersed in a solvent, which is capable of extracting the electrolytic liquid but not capable of dissolving the polymer matrix, for 30 minutes or more to thereby extraction-remove the impregnated electrolytic liquid from the hybrid electrolyte, followed by drying in vacuum to thereby obtain a dried polymer matrix. The weight ($W_1$) of the dried polymer matrix is measured.

Then, the dried polymer matrix is wrapped with a stainless steel wire mesh (150-mesh size) and heated in a solvent selected from good solvents for the polymer (before being subjected to crosslinking treatment) as used for producing the hybrid electrolyte for a predetermined period of time under reflux, followed by drying in vacuum, thereby obtaining an extraction residue. The weight ($W_2$) of the extraction residue is measured. The gel content (%) of the polymer matrix is defined as a value obtained by the formula ($W_2$/$W_1$)×100. The solvent for the extraction under reflux is used in a weight amount of 100 times or more as large as the weight of the dried polymer matrix. It is preferred that when the polymer (before being subjected to crosslinking treatment) is a vinylidene fluoride polymer, a mixed solvent of N,N-dimethylacetamide (DMAC) and acetone (volume ratio of DMAC to acetone=7:3) is used as the solvent, and that when the polymer (before being subjected to crosslinking treatment) is an acrylonitrile polymer, DMAC alone is used as the solvent. Further, in each of these cases, it is preferred that the reflux time is 2 hours or more and the drying is conducted at 70° C. for 4 hours or more.

The shaped porous polymer structure of the hybrid electrolyte of the present invention comprises a polymer matrix having a plurality of cells dispersed therein. Due to such a structure, not only does the hybrid electrolyte comprising a shaped porous polymer structure impregnated and swelled with an electrolytic liquid exhibit a high ionic conductivity, but also the shaped porous polymer structure is advantageously, easily swelled with the electrolytic liquid. The cells may be in the form of closed cells or open cells which form through-holes passing through the shaped porous polymer structure. However, for effectively achieving an easy swelling of the porous polymer structure with an electrolytic liquid, it is preferred that the cells are in the form of open cells which form through-holes passing through the shaped porous polymer structure.

The void ratio of the shaped porous polymer structure is preferably in the range of from 30 to 95% When the void ratio is less than 30%, the ionic conductivity of the final hybrid electrolyte is unsatisfactory. The void ratio is preferably 40% or more, more preferably 50% or more and still more preferably 55% or more. On the other hand, when the void ratio is more than 95%, the mechanical strength of the hybrid electrolyte after being swelled with an electrolytic liquid is unsatisfactory. The void ratio is preferably 90% or less, more preferably 85% or less and still more preferably 80% or less.

Further, it is preferred that the content of the electrolytic liquid in the hybrid electrolyte of the present invention is in the range of from 30 to 95% by weight, based on the weight of the hybrid electrolyte When the content of the electrolytic liquid is less than 30% by weight, the ionic conductivity of the hybrid electrolyte is unsatisfactory. The content of the electrolytic liquid is preferably 40% by weight or more, more preferably 50% by weight or more and still more preferably 55% by weight or more. On the other hand, when the content of the electrolytic liquid is more than 95% by weight, the mechanical strength of the hybrid electrolyte is unsatisfactory. The content of the electrolytic liquid is preferably 90% by weight or less, more preferably 85% by weight or less, still more preferably 80% by weight or less.

The void ratio of the shaped porous polymer structure can be obtained by the method comprising filling the voids of the shaped porous polymer structure with a non-solvent for the polymer matrix, followed by determining the weight of the non-solvent filling into the voids. Specifically, when the polymer matrix is produced using, for example, a vinylidene fluoride polymer or an acrylonitrile polymer, the void ratio of the shaped porous polymer structure can be obtained as follows.

First, the weight (on a dry basis)(A) of a shaped porous polymer structure is measured. Next, the shaped porous polymer structure is immersed in ethanol to thereby render hydrophilic the polymer structure. Subsequently, the resultant hydrophilic polymer structure is immersed in water, thereby replacing the impregnated ethanol by water. The water on the surface of the polymer structure is removed by wiping, and then, the weight (B) of the resultant water-wiped polymer structure is measured. From the weights (A) and (B) obtained above, and the true specific gravity (d) of the material which the shaped porous polymer structure is made of, the void ratio of the shaped porous polymer structure is calculated according to the following formula:

$$\text{void ratio (\%)} = [(B-A)/(A/d+B-A)] \times 100.$$

The form of the hybrid electrolyte of the present invention varies depending on the use thereof. However, when the hybrid electrolyte is sandwiched between the electrodes and used as an electrolyte for the above-mentioned so-called polymer battery, it is preferred that the hybrid electrolyte is in the form of a sheet, a woven fabric, or a nonwoven fabric. In this case, the thickness of the hybrid electrolyte in the form of a sheet is generally in the range of from 1 to 500 $\mu$m, preferably from 10 to 300 $\mu$m, more preferably from 20 to 150 $\mu$m. It is preferred that the shaped porous polymer structure in the form of a sheet, which is used for producing the above-mentioned hybrid electrolyte in the form of a sheet, has a thickness in the same range as mentioned above. When the thickness of the hybrid electrolyte or shaped porous polymer structure in the form of a sheet is less than 1 $\mu$m, the mechanical strength of hybrid electrolyte or shaped porous polymer structure is unsatisfactory. Further, when such a hybrid electrolyte is laminated onto an electrode to thereby obtain a battery, a short-circuiting of the obtained battery between the electrodes is likely to occur. On the other hand, when the thickness of the hybrid electrolyte or shaped porous polymer structure in the form of a sheet is more than 500 $\mu$m, the effective electric resistance as a hybrid electrolyte is disadvantageously high and, for example, when such a hybrid electrolyte is used as an electrolyte for a polymer battery, the energy density per volume is extremely low.

There is no particular limitation with respect to the methods for producing the shaped porous polymer structure used in the present invention As a method for producing a shaped porous polymer structure comprising open cells which form through-holes passing through the shaped porous polymer structure, a conventional method for producing a microfilter or ultrafilter can be employed. Examples of such methods include the methods described in Unexamined Japanese Patent Application Laid-Open Specification No. 3-215535, Examined Japanese Patent Application Publication No. 61-38207 and Unexamined Japanese Patent Application Laid-Open Specification No. 54-16382. Examples of such methods include the fusing method and the wet method The fusing method is a method for producing a shaped porous polymer structure in the form of a sheet, which comprises fusing a polymer together with a plasticizer, an inorganic particulate and the like to thereby obtain a fused polymer; shaping the obtained fused polymer into a sheet to thereby obtain a shaped polymer structure in the form of a sheet; and extraction-removing the plasticizer, the inorganic particulate and the like contained in the shaped polymer structure to thereby obtain a desired, shaped porous polymer structure On the other hand, the wet method is another method for producing a shaped porous polymer structure in the form of a sheet, which comprises dissolving a polymer into a solvent together with a surfactant, an additive and the like to thereby obtain a solution; casting the obtained solution into a liquid film; and immersing the liquid film in a non-solvent for the polymer so as to solidify the film and so as to remove the solvent, surfactant, additive and the like contained in the liquid film, to thereby obtain a desired shaped porous polymer structure.

Further, examples of methods for producing a shaped porous polymer structure containing closed cells include a method comprising shaping a polymer containing a foaming agent to obtain a shaped structure having dispersed therein the foaming agent; and heating the shaped structure or holding the shaped structure under reduced pressure so as to form closed cells in the shaped structure, thereby obtaining a shaped porous polymer structure comprising the closed cells. As a method for producing the shaped porous polymer structure of the present invention, the above-mentioned methods can be used individually or in combination.

In the present invention, there is no particular limitation with respect to the method for swelling a shaped porous polymer structure with an electrolyte so as to produce the hybrid electrolyte of the present invention. There can be mentioned a method comprising holding an impregnated, shaped porous polymer structure (i.e., a shaped porous polymer structure which is impregnated with an electrolytic liquid, wherein the electrolytic liquid is used in an amount sufficient to swell the shaped porous polymer structure) under predetermined swelling temperature and pressure conditions at which the shaped porous polymer structure is susceptible to swelling with the electrolytic liquid, to thereby swell the porous polymer structure. After the swelling, the swelled, shaped porous polymer structure may or may not exhibit dimensional change. The expression "the shaped porous polymer structure does not exhibit dimensional change" means that the shaped porous polymer structure before impregnation with an electrolytic liquid is substantially identical in size with the hybrid electrolyte produced using the shaped polymer structure, but the shaped porous polymer structure in the hybrid electrolyte is in a swollen state as defined above. That is, even if the shaped porous polymer structure does not exhibit any dimensional change after swelling, the degree of shrinkage of the shaped porous polymer structure of the hybrid electrolyte of the present invention is more than 10%, wherein the degree of shrinkage of the shaped porous polymer structure is defined as the change in the longitudinal length of the dried polymer matrix (i.e., the shaped porous polymer structure obtained by removing the impregnated electrolytic liquid from the hybrid electrolyte, followed by drying in vacuum), relative to the longitudinal length of the electrolytic liquid-impregnated hybrid electrolyte.

Further, as mentioned above, the gel content of the polymer matrix of the hybrid electrolyte of the present invention must be within the above-mentioned specific range. Depending on the method of swelling a shaped porous polymer structure with an electrolytic liquid for producing a hybrid electrolyte, it is possible that a portion of the polymer matrix is dissolved in the electrolytic liquid, so that the gel content of the polymer matrix remaining undissolved becomes higher than the above-mentioned specific range. However, when a shaped porous polymer structure is swelled with an electrolytic liquid by an appropriate method, such as a method in which the electrolytic liquid is used in an amount insufficient to unrestrictedly swell the shaped porous polymer structure (i.e. in an amount such that the swelling of the shaped porous polymer structure cannot reach the equilibrium of swelling), or a method in which the temperature and time for swelling the shaped porous polymer structure with the electrolytic liquid is controlled, the dissolution of a portion of the polymer matrix in the electrolytic liquid during the immersion of the shaped porous polymer structure in the electrolytic liquid is prevented, so that the gel content of the polymer matrix can be maintained at a level within the above-mentioned specific range. By such methods, the hybrid electrolyte of the present invention can be produced.

Alternatively, the hybrid electrolyte of the present invention can be effectively produced by the following method. That is, first, a shaped porous polymer structure is impregnated with an electrolytic liquid under predetermined non-swelling temperature and pressure conditions at which the shaped porous polymer structure is substantially insusceptible to swelling with the electrolytic liquid, thereby obtaining an impregnated, shaped porous polymer structure. In general, as a method for impregnating the shaped porous polymer structure, there can be mentioned a method wherein the shaped porous polymer structure is immersed in an electrolytic liquid bath. As another method for impregnating the shaped porous polymer structure, there can be mentioned a method in which the electrolytic liquid is applied to the shaped porous polymer structure by spraying or coating. The impregnated, shaped porous polymer structure obtained by the above methods is still not swelled with the electrolytic liquid, so that the shaped porous polymer structure has a satisfactorily high mechanical strength and that a dimensional change of the shaped porous polymer structure does almost not occur. Therefore, at this stage of only impregnation, the handling of the shaped porous polymer structure is relatively easy.

Next, the shaped porous polymer structure in the above-mentioned state is taken out of the impregnating device, such as the electrolytic liquid bath, the spraying device, the coating device or the like. The excess electrolytic liquid on the shaped porous polymer structure flows down so as to be removed from the polymer structure. If desired, the excess electrolytic liquid is removed by an appropriate method, such as shaking off, wiping out or the like.

On the other hand, in the present invention, a method can be employed in which the shaped porous polymer structure may be laminated to an electrode to thereby obtain a laminate structure, and the laminate structure is impregnated with the electrolytic liquid under predetermined non-swelling temperature and pressure conditions at which the shaped porous polymer structure is substantially insusceptible to swelling with the electrolytic liquid, to thereby obtain an impregnated laminate structure. The excess electrolytic liquid on the obtained impregnated laminate structure is removed in substantially the same manner as mentioned above.

The ionic conductivity of the impregnated, shaped porous polymer structure in the above-mentioned non-swollen state is not satisfactorily high. However, when the impregnated, shaped porous polymer structure as such, or the impregnated laminate structure (wherein the impregnated shaped porous polymer structure is laminated to an electrode) is held under predetermined swelling temperature and pressure conditions at which the shaped porous polymer structure is susceptible to swelling with the electrolytic liquid, to thereby swell the shaped porous polymer structure with the electrolytic liquid, a hybrid electrolyte having a high ionic conductivity of the present invention can be easily obtained. Especially when the impregnated, shaped porous polymer structure is laminated to an electrode and the resultant laminate structure is heated for swelling, the improvement of the ionic conductivity and the adhesion of the resultant hybrid electrolyte to the electrode can be simultaneously achieved.

Further, when the above-mentioned "impregnating and swelling" method of the present invention is employed, it becomes possible to prevent the dissolution of a portion of the polymer matrix into the electrolytic liquid, so that the electrolytic liquid bath or the like is free from dusty substances derived from a portion of the polymer matrix which is dissolved in the electrolytic liquid.

As described above, in general, when a crosslinked polymer is unrestrictedly swelled in a solvent or solution, the crosslinked polymer is swelled, with a great dimensional change, until the swelling of the crosslinked polymer reaches the equilibrium of swelling. It is extremely difficult to control, in order to prevent the dimensional change of the crosslinked polymer, the quantity of the solvent or solution entering the crosslinked polymer for the swelling of the crosslinked polymer so that the swelling of the crosslinked polymer does not reach the equilibrium of swelling. However, when a shaped porous polymer structure is swelled with an electrolytic liquid by the above-mentioned "impregnating and swelling" method, the void ratio of the shaped porous polymer structure functions to provide a limitation with respect to the quantity of the electrolytic liquid entering the shaped porous polymer structure for the swelling of the shaped porous polymer structure, so that the degree of swelling of the shaped porous polymer structure is also limited. Accordingly, the great dimensional change and lowering of the mechanical strength of the shaped porous polymer structure due to the swelling do not occur. Therefore, especially when the shaped porous polymer structure (which may be either impregnated or not impregnated with an electrolytic liquid as described below) is laminated to an electrode before the shaped porous polymer structure is swelled with an electrolytic liquid, the above-mentioned "impregnating and swelling" method is advantageous in that not only can a shaped porous polymer structure having a high mechanical strength be laminated to an electrode, but also the dimensional change of the shaped porous polymer structure due to the swelling can be suppressed.

The swelling is generally conducted under atmospheric pressure, but, if desired, it may be conducted under reduced pressure or superatmospheric pressure. The electrolytic liquid may or may not remain in the cells of the hybrid electrolyte after the swelling (the cells are those which are derived from the cells of the shaped porous polymer structure). However, it is preferred that the hybrid electrolyte contains a liquid phase, especially a liquid phase passing through the hybrid electrolyte.

Thus, in a further aspect of the present invention, there is provided a method for producing an electrochemical device, which comprises:

impregnating a shaped porous polymer structure, which comprises a polymer matrix and a plurality of cells dispersed in the polymer matrix, wherein the polymer matrix contains a crosslinked polymer segment, with an electrolytic liquid selected from the group consisting of a solution of an electrolyte in water or a non-aqueous solvent and a liquid electrolyte under predetermined non-swelling temperature and pressure conditions at which the shaped porous polymer structure is substantially insusceptible to swelling with the electrolytic liquid, thereby obtaining an impregnated, shaped porous polymer structure;

laminating the impregnated, shaped porous polymer structure to an electrode to thereby obtain a laminate structure; and holding the laminate structure under predetermined swelling temperature and pressure conditions at which the shaped porous polymer structure is susceptible to swelling with the electrolytic liquid.

In still a further aspect of the present invention, there is provided a method for producing an electrochemical device, which comprises:

laminating a shaped porous polymer structure, which comprises a polymer matrix and a plurality of cells dispersed in the polymer matrix, wherein the polymer matrix contains a crosslinked polymer segment, to an electrode to thereby obtain a laminate structure;

impregnating the laminate structure with an electrolytic liquid selected from the group consisting of a solution of an electrolyte in water or a non-aqueous solvent and a liquid electrolyte under predetermined non-swelling temperature and pressure conditions at which the shaped porous polymer structure is substantially insusceptible to swelling with the electrolytic liquid, thereby obtaining an impregnated laminate structure; and holding the impregnated laminate structure under predetermined swelling temperature and pressure conditions at which the shaped porous polymer structure is susceptible to swelling with the electrolytic liquid In the present invention, the "swelling temperature and pressure conditions at which the shaped porous polymer structure is susceptible to swelling with the electrolytic liquid" are the temperature and pressure conditions at which the change (%) in the longitudinal length of the shaped porous polymer structure, which is determined after immersing the shaped porous polymer structure in an electrolytic liquid under predetermined temperature and pressure conditions, relative to the longitudinal length measured before the immersion, is more than 10%. Therefore, the susceptibility of the shaped porous polymer structure to swelling with the electrolytic liquid (under predetermined temperature and pressure conditions) can be confirmed from the occurrence of dimensional change of the shaped porous polymer structure at the immersion of the shaped porous polymer structure in the electrolytic liquid under the predetermined temperature and pressure conditions. However, with respect to the above-mentioned method (i.e., a method which comprises impregnating a shaped porous polymer structure with an electrolytic liquid under predetermined non-swelling temperature and pressure conditions at which the shaped porous polymer structure is substantially insusceptible to swelling with the electrolytic liquid, thereby obtaining an impregnated, shaped porous polymer structure; removing the excess electrolytic liquid on the obtained impregnated, shaped porous polymer structure; laminating the impregnated, shaped porous polymer structure to an electrode to thereby obtain a laminate structure; and holding the laminate structure under predetermined swelling temperature and pressure conditions at which the shaped porous polymer structure is susceptible to swelling with the electrolytic liquid, so that the shaped porous polymer structure is swelled with the electrolytic liquid), the size of the shaped porous polymer structure which is swelled with the electrolytic liquid is substantially the same as the size of the shaped porous polymer structure which is not swelled with the electrolytic liquid. Therefore, the susceptibility of the shaped porous polymer structure to swelling with the electrolytic liquid cannot be confirmed directly from an occurrence of dimensional change of the shaped porous polymer structure in the middle of the above-mentioned method, and it is necessary to separately confirm the swelling temperature and pressure conditions at which the shaped porous polymer structure is susceptible to swelling with the electrolytic liquid, with respect to the shaped porous polymer structure in a non-laminated form.

Further, in the present invention, the "non-swelling temperature and pressure conditions at which the shaped porous polymer structure is substantially insusceptible to swelling with the electrolytic liquid" are the temperature and pressure conditions at which the change (%) in the longitudinal length of the shaped porous polymer structure, which is determined after immersing the shaped porous polymer structure in the electrolytic liquid under predetermined temperature and pressure conditions, relative to the longitudinal length measured before the immersion, is 10% or less, or the temperature and pressure conditions at which the degree of shrinkage (%) of the shaped porous polymer structure [which is defined as the change in the longitudinal length of the dried polymer matrix {i.e., the shaped porous polymer structure obtained by extraction-removing the impregnated electrolytic liquid from the hybrid electrolyte (which is obtained by immersing the shaped porous polymer matrix in the electrolytic liquid under predetermined temperature and pressure conditions), followed by drying at room temperature}], relative to the longitudinal length of the electrolytic liquid-impregnated hybrid electrolyte, is 10% or less.

The type of polymer for use in producing the hybrid electrolyte of the present invention varies depending on the type of the electrolytic liquid used. conversely, the type of hydrolytic liquid for use in producing the hybrid electrolyte of the present invention varies depending on the type of the polymer used. The electrolytic liquid contained in the hybrid electrolyte of the present invention is selected from the group consisting of a solution of an electrolyte in water or a non-aqueous solvent and a liquid electrolyte. Examples of electrolytic liquids are described below. The electrolyte used in the form of a solution in water or a non-aqueous solvent may be an inorganic or organic salt or an inorganic or organic acid. Examples of electrolytes include inorganic acids, such as tetrafluoroboric acid, hexafluorophosphoric acid, perchloric acid, hexafluoroarsenic acid, nitric acid, sulfuric acid, phosphoric acid, hydrofluoric acid, hydrochloric acid, hydrobromic acid, hydroiodic acid and the like; organic acids, such as trifluoromethanesulfonic acid, heptafluoropropylsulfonic acid, bis(trifluoromethanesulfonyl)

imide acid, acetic acid, trifluoroacetic acid, propionic acid and the like; and salts of these inorganic and organic acids. Further, the above-mentioned acids and salts can be used individually or in combination. Examples of cations for the above-mentioned electrolytic salts include an alkali metal, an alkaline earth metal, a transition metal, a rare earth metal, an ammonium ion and the like. The above-mentioned cations can be used individually or in combination. The preferred cation species varies depending on the use of the hybrid electrolyte. For example, when the hybrid electrolyte of the present invention is used in a lithium battery, it is preferred to use a lithium salt as an electrolyte. Especially when the hybrid electrolyte of the present invention is used in a lithium secondary battery, in which a wide range of electrochemical window is utilized, it is preferred that the electrolyte is an electrochemically stable lithium salt. Examples of such lithium salts include a lithium salt of fluoroalkylsulfonic acid, such as $CF_3SO_3Li$ and $C_4F_9SO_3Li$; and a lithium salt of sulfonimide, such as $(CF_3SO_2)_2NLi$; $LiBF_4$, $LiPF_6$, $LiClO_4$ and $LiAsF_6$. The appropriate concentration of the electrolyte in a solution varies depending on the use of the hybrid electrolyte. However, it is generally in the range of from 0.1 mol/liter to the saturation solubility, preferably in the range of from 0.5 to 5 mol/liter, more preferably in the range of from 0.5 to 2 mol/liter.

As a solvent for dissolving the above-mentioned electrolyte, there can be mentioned chemically stable solvents in which the above-mentioned electrolyte can be dissolved, such as water, alcohol and the like. When the hybrid electrolyte of the present invention is used in an electrochemical device containing a non-aqueous electrolytic liquid, such as a lithium battery, examples of solvents include carbonate compounds, such as ethylene carbonate, propylene carbonate, dimethyl carbonate, diethyl carbonate, methyl ethyl carbonate and the like; ether compounds, such as tetrahydrofuran, dimethoxyethane, diglyme, tetraglyme, oligoethylene oxide and the like; lactone compounds, such as γ-butyrolactone, β-propiolactone and the like; and nitrile compounds, such as acetonitrile, propionitrile and the like.

Among the above-mentioned polymers and electrolytic liquids, an appropriate combination of a polymer and an electrolytic liquid is employed, wherein the shaped porous polymer structure produced using the polymer is swelled with the electrolytic liquid. It is preferred that the shaped porous polymer structure produced using the polymer is susceptible to swelling with the electrolytic liquid (a solution of an electrolyte) at a temperature which is lower than the boiling point of the solvent for dissolving the electrolyte. It is especially preferred that the shaped porous polymer structure produced using the polymer is susceptible to swelling with the electrolytic liquid (a solution of an electrolyte) at a temperature which is lower than the boiling point of the solvent for dissolving the electrolyte, but the shaped porous polymer structure is substantially insusceptible to swelling with the electrolytic liquid at room temperature. As examples of such combinations, there can be mentioned a combination of a carbonate solvent, such as ethylene carbonate and propylene carbonate, as a solvent for the electrolyte and a vinylidene fluoride polymer (i.e., polyvinylidene fluoride and a copolymer of vinylidene fluoride), or polyacrylonitrile as a polymer. When the above combination of a solvent and a polymer is employed, the impregnation is preferably conducted at the temperature of 35° C. or less and the swelling is preferably conducted at the temperature of 80° C. or more, more preferably 90° C. or more.

In the present invention, it is required that the shaped porous polymer structure be finally swelled with the electrolytic liquid. Whether or not the shaped porous polymer structure is susceptible to swelling with the electrolytic liquid under a certain pressure depends on the temperature. That is, the shaped porous polymer structure is substantially insusceptible to swelling with the electrolytic liquid under a certain temperature. Practically, it is preferred that the non-swelling temperature and pressure conditions at which the shaped porous polymer structure is substantially insusceptible to swelling are the conditions of approximately room temperature and approximately atmospheric pressure. Incidentally, whether or not the shaped porous polymer structure is susceptible to swelling with the electrolytic liquid depends also on the time of contacting the shaped porous polymer structure with the electrolytic liquid. However, when almost no change in size of the shaped porous polymer structure occurs even after immersing the shaped porous polymer structure in the electrolytic liquid for approximately one hour at a predetermined temperature under atmospheric pressure, the shaped porous polymer structure is regarded as substantially insusceptible to swelling with the electrolytic liquid at the predetermined temperature.

On the other hand, the susceptibility of the shaped porous polymer structure to swelling with the electrolytic liquid at a predetermined temperature can be confirmed from the occurrence of dimensional change of the shaped porous polymer structure at the immersion of the shaped porous polymer structure In the electrolytic liquid at the predetermined temperature. That is, when the shaped porous polymer structure is swelled with the electrolytic liquid by heating under a certain pressure, the lowest temperature required for swelling the shaped porous polymer structure varies depending on the types of the polymer and the electrolytic liquid which are used in combination. The lowest temperature can generally be determined by measuring the temperature at which the dimensional change of the shaped porous polymer structure occurs when the shaped porous polymer structure is immersed in the electrolytic liquid. However, when the shaped porous polymer structure is laminated to an electrode, it is difficult to know whether or not the dimensional change of the shaped porous polymer structure has occurred. Therefore, it is preferred to separately determine the lowest temperature required for swelling, with respect to the shaped porous polymer structure in a non-laminated form. The lowest temperature required for swelling is preferably higher than room temperature, more preferably not less than 20° C. higher than room temperature, and lower than the boiling point of the solvent used for the electrolytic liquid. Further, when the shaped porous polymer structure is heated so as to be swelled with an electrolytic liquid after the shaped porous polymer structure is laminated to an electrode, the lowest temperature required for swelling is preferably lower than the temperature at which the electrode activity of an electrode material used for the electrode begins to deteriorate. The time of heating required for swelling varies depending on the temperature for swelling and the mode of heating and, therefore, cannot be simply determined. However, the heating is conducted generally for 2 minutes or more, preferably 10 minutes or more, more preferably 30 minutes or more. When the temperature for swelling is satisfactorily higher than the lowest temperature required for swelling, about 2 minutes of heating is sufficient for swelling.

As mentioned above, as methods for producing an electrochemical device, such as a battery, in which the hybrid electrolyte of the present invention is contained, there can be mentioned the following two methods, i.e., a method which comprises impregnating a shaped porous polymer structure with an electrolytic liquid, thereby obtaining an impregnated, shaped porous polymer structure; laminating the impregnated, shaped porous polymer structure to an electrode to thereby obtain a laminate structure; and heating the laminate structure, and a method which comprises laminating a shaped porous polymer structure to an electrode to thereby obtain a laminate structure; impregnating the laminate structure with an electrolytic liquid, thereby obtaining an impregnated laminate structure; and heating the impregnated laminate structure. With respect to the latter method, when an electrode having a current collector is used for producing an electrochemical device, the laminate structure can be effectively impregnated with the electrolytic liquid by using, as the current collector, a mesh current collector. Examples of morphologies of the laminate structures include a sheet form, a roll form, a folding sheet form, a laminate form and the like.

In the method of the present invention for producing an electrochemical device, the material for an electrode varies depending on the type of the electrochemical device to be produced. For example, when the electrochemical device is a lithium battery, a substance capable of occluding and releasing lithium is used as a material for the positive electrode and negative electrode. As the positive electrode material, a material having a higher electric potential than that of the negative electrode is selected. Examples of such positive electrode materials include oxides, such as $Li_{1-x}CoO_2$, $Li_{1-x}NiO_2$, $Li_{1-x}Mn_2O_4$, $Li_{1-x}MO_2$ (wherein 0<X<1, and M represents a mixture of Co, Ni, Mn and Fe), $Li_{2-y}Mn_2O_4$ (wherein 0<Y<2), $Li_{1-x}V_2O_5$, $Li_{2-y}V_2O_5$ (wherein 0<Y<2) and $Li_{1.2-x}Nb_2O_5$ (wherein 0<X'<1.2); metal chalcogenides, such as $Li_{1-x}TiS_2$, $Li_{1-x}MoS_2$ and $Li_{3-z}NbSe_3$ (wherein 0<Z<3); and organic compounds, such as-polypyrrole, polythiophene, polyaniline, a polyacene derivative, polyacetylene, polythienylene vinylene, polyallylene vinylene, a dithiol derivative and a disulfide derivative.

As the negative electrode material, a material having a lower electric potential than that of the positive electrode is employed. Examples of negative electrode materials include metallic lithium-containing materials, such as metallic lithium, an aluminum-lithium alloy and a magnesium-aluminum-lithium alloy; carbonaceous materials, such as a graphite, a coke, a low temperature-calcined polymer; lithium solid solutions of metal oxides, such as an SnM oxide (wherein M represents Si, Ge or Pb), a complex oxide of $Si_{1-y}M'YOZ$ oxide (wherein M' represents W, Sn, Pb, B or the like), a titanium oxide and an iron oxide; and ceramics, such as nitrides, e.g., $Li_7MnN_4$, $Li_3FeN_2$, $Li_{3-x}Co_xN$, $Li_{3-x}NiN$, $Li_{3-x}Cu_xN$, $Li_3BN_2$, $Li_3AlN_2$ and $Li_3SiN_3$. It should be noted that when metallic lithium formed on the negative electrode by the reduction of lithium ions on the negative electrode is used as a negative electrode material, the type of the material for the negative electrode is not particularly limited as long as it is electrically conductive.

The positive and negative electrodes are produced by molding the above-mentioned materials into predetermined morphologies. The electrode may be either In the form of a continuous solid or in the form of a particulate electrode material dispersed in a binder. Examples of methods for forming a continuous solid include electrolysis, vapor deposition, sputtering, CVD, melt processing, sintering and compression. In a method for forming a particulate electrode material dispersed in a binder, an electrode is produced by molding a mixture of a particulate electrode material and a binder. Examples of binders include an ionic conductive polymer, such as polyvinylidene fluoride; a non-ionic conductive polymer, such as a styrene-butadiene latex and Teflon latex; and metals. A polymerizable monomer and a crosslinking agent may be added to the binder, and the resultant mixture may be subjected to molding, followed by polymerization and crosslinking. For the purpose of improving the binding strength of such a binder or modifying the properties of such a binder, the binder may be irradiated with radiant energy, such as electron beams, γ-rays, and ultraviolet rays. For effecting ion transportation between the positive and negative electrodes, current collectors made of a material having low electrical resistance may be provided on the positive and negative electrodes. In producing an electrode according to the above-mentioned methods, the current collector is used as a substrate for the electrode.

When a shaped porous polymer structure is laminated to an electrode, the electrode can be impregnated with an electrolytic liquid in advance. When a laminate structure comprising an impregnated, shaped porous polymer structure or a hybrid electrolyte and an electrode is heated in the presence of the electrolytic liquid used for impregnating the electrode, the adherence strength of the impregnated, shaped porous polymer structure or the hybrid electrolyte to the electrode is remarkably improved.

Examples of electrochemical devices comprising the hybrid electrolyte of the present invention include primary and secondary batteries (e.g., a lithium battery), a photoelectrochemical device and an electrochemical sensor.

As mentioned above, the hybrid electrolyte of the present invention has a high ionic conductivity, an excellent high temperature stability and an excellent adherability to an electrode. Further, when the method of the present invention is employed for producing a hybrid electrolyte or an electrochemical device, during the course of the production of the hybrid electrolyte or the electrochemical device, not only is the strength of an impregnated, shaped porous polymer structure extremely high, but also the dimensional change of the shaped porous polymer structure swelled with an electrolytic liquid, relative to the shaped porous polymer structure which is not swelled, is advantageously suppressed. Therefore, it becomes possible to effectively produce not only a hybrid electrolyte having the above-mentioned excellent properties, but also a high performance electrochemical device. Further, the method of the present invention is very advantageous from an industrial point of view in that, in practicing the method of the present invention, a dissolution of a portion of the polymer matrix into an electrolytic liquid does not occur and, therefore, the impregnation apparatus, such as an electrolyte liquid bath, is free from dusty substances derived from a portion of the polymer matrix which is dissolved in the electrolytic liquid. The hybrid electrolyte of the present lnvention is especially useful as an electrolyte for the so-called polymer batteries.

BEST MODE FOR CARRYING OUT THE INVENTION

The present invention will be described in more detail with reference to Examples and Comparative Examples, which should not be construed as limiting the scope of the present invention.

In the Examples and Comparative Examples, the measurement of the void ratio of a shaped porous polymer structure, the measurement of the degree of shrinkage of a shaped porous polymer structure, the measurement of the gel content of a polymer matrix, and the evaluation of the ionic conductivity were performed by the following methods.

(i) Measurement of the Void Ratio of a Shaped Porous Polymer Structure

First, the weight on a dry basis (A) of a shaped porous polymer structure was determined. Next, the shaped porous polymer structure was immersed in ethanol to thereby render hydrophilic the polymer structure. Subsequently, the resultant hydrophilic polymer structure was immersed in water, thereby replacing the impregnated ethanol by water. The water on the surface of the polymer structure was removed by wiping, and then, the weight (B) of the resultant water-wiped polymer structure was measured. From the weights (A) and (B) obtained above and the true specific gravity (d) of the material which the shaped porous polymer structure is made of, the void ratio of the shaped porous polymer structure was calculated according to the following formula:

$$\text{void ratio } (\%) = [(B-A)/(A/d+B-A)] \times 100.$$

(ii) Measurement of the Degree of Shrinkage of a Shaped Porous Polymer Structure and Measurement of the Gel Content of a Polymer Matrix From a produced hybrid electrolyte sheet impregnated with an electrolytic liquid was cut out a sample having a predetermined size, and the sample was immersed in ethanol for 30 minutes or more to thereby extraction-remove the impregnated electrolytic liquid from the sample, followed by drying in vacuum to thereby obtain a dried polymer matrix. The weight of the dried polymer matrix was measured.

In this instance, the degree of shrinkage of the shaped porous polymer structure of the hybrid electrolyte was determined. That is, the change in the longitudinal length of the above-obtained dried polymer matrix (shaped porous polymer structure), relative to the longitudinal length of the electrolytic liquid-impregnated hybrid electrolyte sheet, was determined. This change (%) is defined as the degree of shrinkage of the shaped porous polymer structure.

The weight of the above-obtained dried polymer matrix was measured Then, the dried polymer matrix was wrapped with a stainless steel wire mesh (150-mesh size) and heated in a solvent for 4 hours under reflux, wherein the solvent was used in a weight amount of not less than 1000 times the weight of the dried polymer matrix. As the solvent, a mixed solvent of N,N-dimethylacetamide (DMAC) and acetone (volume ratio of DMAC to acetone=7:3) was used for a vinylidene fluoride polymer matrix, and DMAC alone was used for an acrylonitrile polymer matrix. Subsequently, the resultant polymer matrix was subjected to extraction with acetone for 5 minutes, followed by drying in vacuum at 70° C., thereby obtaining an extraction residue. The weight of the extraction residue was measured. The gel content of the polymer matrix was defined as a value obtained by dividing the weight of the extraction residue by the weight of the dried polymer matrix.

(iii) Evaluation of the Ionic Conductivity

A sample (an impregnated porous polymer sheet, or a hybrid electrolyte, i.e., a swollen form of an impregnated porous polymer sheet) was sandwiched between two electrode sheets to thereby obtain an electrochemical cell. An alternating voltage was applied between the electrodes, and the complex impedance was measured by alternating-current impedance method. In accordance with a conventional method, the ionic conductivity of the sample was calculated from the real part of the obtained complex impedance expressed in the form of a Cole-Cole plot, the thickness of the sample, and the surface areas of the electrodes.

EXAMPLE 1

Production of a hybrid electrolyte

A solution consisting of 17.3 parts by weight of a hexafluoropropylene/vinylidene fluoride copolymer resin (hexafluoropropylene content: 5% by weight), 11.5 parts by weight of polyethylene glycol (average molecular weight: 200) and 71.2 parts by weight of dimethylacetamide was prepared, and to 100 g of the thus prepared solution was added 0.8 ml of polyoxyethylene sorbitane monooleate (Trade name: Tween 80, manufactured and sold by Kao Atlas K.K., Japan), thereby obtaining a homogeneous solution. The obtained homogeneous solution was cast on a glass plate at room temperature, thereby preparing a liquid film having a thickness of 200 μm. Immediately, the prepared liquid film was immersed in water at 70° C. to thereby solidify the film, and then, the solidified film was washed with water and alcohol, followed by drying, thereby obtaining a porous polymer sheet having a thickness of 52 μm and a void ratio of 76%. The prepared porous polymer sheet was irradiated with electron beams (irradiation dose: 15 Mrads) to thereby prepare a crosslinked porous polymer sheet.

An electrolytic liquid was obtained by dissolving lithium tetrafluoroborate ($LiBF_4$) in a mixed solvent of ethylene carbonate (EC) and propylene carbonate (PC) (EC/PC weight ratio=1/1, and $LiBF_4$ concentration: 1 mol/liter), and the crosslinked porous polymer sheet prepared above was immersed in the above-obtained electrolytic liquid at room temperature. When the crosslinked porous polymer sheet was immersed in the electrolytic liquid, the sheet was immediately impregnated with the electrolytic liquid, and an impregnated transparent porous polymer sheet was obtained with ease. The electrolytic liquid on the surface of the impregnated porous polymer sheet (that is, an excess electrolytic liquid which did not impregnate the porous polymer sheet) was removed by wiping the porous polymer sheet. The change in the size of the impregnated porous polymer sheet was 5% in the longitudinal direction of the sheet, relative to the size of the non-impregnated porous polymer sheet The impregnated porous polymer sheet was sandwiched between two glass plates and heated at 100° C. in an oven for 2 hours, to thereby obtain a hybrid electrolyte sheet. No change in the size of the impregnated porous polymer sheet was observed between the impregnated porous polymer sheet before the heat treatment and the hybrid electrolyte sheet obtained after the heat treatment. From the obtained hybrid electrolyte sheet was cut out a sample having a predetermined size, and the electrolytic liquid was removed by extraction, followed by drying, to thereby obtain a dried polymer matrix. The degree of shrinkage of the porous polymer sheet was 16%, as calculated from the size of the dried polymer matrix and the size of the hybrid electrolyte sheet, and the gel content of the polymer matrix was 62%. On the other hand, when the above-obtained crosslinked porous polymer sheet was immersed in the electrolytic liquid at 100° C. for 1 hour, the size of the porous polymer sheet increased by 36% in the longitudinal direction of the sheet, based on the size of the porous polymer sheet before the immersion in the electrolytic liquid. Thus, the above-mentioned temperature was confirmed to be a temperature at which the porous polymer sheet can be swelled with the electrolytic liquid.

A sample of the obtained hybrid electrolyte sheet was sandwiched between two stainless steel sheets, thereby obtaining an electrochemical cell. The obtained electrochemical cell was subjected to a measurement of an alternating-current impedance, using the above-mentioned two stainless steel sheets as electrodes. (The alternating-current impedance was measured by means of impedance measurement apparatus Model 389 manufactured and sold by Seiko EG&G, Japan). As a result, it was found that the ionic conductivity of the hybrid electrolyte sheet at room temperature was 1.3 mS/cm.

<Production of a battery>

A powder of lithium cobalt oxide ($LiCoO_2$; average particle diameter: 10 $\mu$m) and carbon black were added to and dispersed in a 5% by weight solution of polyvinylidene fluoride (KF1100, manufactured and sold by Kureha Chemical Industry Co., Ltd., Japan) in N-methylpyrrolidons (NMP), so that a slurry containing solid components in the following weight ratio was obtained: $LiCoO_2$ (85%), carbon black (8%) and polyvinylidene fluoride (7%). The obtained slurry was applied onto an aluminum foil (as a current collector) by doctor blade method and dried, to thereby prepare an electrode layer having a thickness of 110 $\mu$m. The prepared electrode layer on the aluminum sheet was used as an $LiCoO_2$ electrode sheet (positive electrode).

A powder of needle coke (NC) having an average particle diameter of 10 $\mu$m was homogeneously mixed with the above-mentioned 5% by weight solution of polyvinylidene fluoride in N-nethylpyrrolidone (NMP), thereby obtaining a slurry (NC/polymer dry weight ratio=92:8). The obtained slurry was applied onto a copper sheet (as a current collector) by doctor blade method and dried, to thereby prepare an electrode layer having a thickness of 120 $\mu$m. The prepared electrode layer on the copper sheet was used as a needle coke electrode sheet (negative electrode).

From the $LiCoO_2$ electrode sheet and the needle coke electrode sheet were individually cut out a sample having a size of 4 cm×4 cm, and the obtained samples were impregnated with the electrolytic liquid mentioned above. From an impregnated porous polymer sheet, obtained by immersing the crosslinked porous polymer sheet in the above-mentioned electrolytic liquid at room temperature, was cut out a sample having a size of 4.5 cm×4.5 cm, and the sample of the impregnated porous polymer sheet was sandwiched between the above-prepared electrode sheets so as to obtain a laminate structure (when preparing the laminate structure, both sides of the impregnated porous polymer sheet were respectively, securely attached to the electrode layers of the two electrode sheets), thereby preparing a battery composed of a negative electrode (needle cokes), an impregnated porous polymer sheet, and a positive electrode ($LiCoO_2$). The prepared battery was further sandwiched between two glass plates and held by means of a clip. Then, the resultant structure was heated at 100° C. for 2 hours, followed by cooling to room temperature, and the glass plates were removed from the battery. Stainless steel sheets (as electric terminals for taking a current) were brought into contact with the respective current collectors of the positive and negative electrodes of the battery, and the battery was placed between two opposite PET/Al/PE laminate films (PET: polyethylene terephthalate film, Al: aluminum sheet, PE: polyethylene film) so that the current collectors project from the resultant structure. The laminate structure of the resultant structure was made secure by means of a laminator, to thereby obtain a sheet battery.

The electric terminals of the obtained sheet battery were connected to a charge/discharge testing device (Model 101SM, manufactured and sold by Hokuto Denko Corporation, Japan), and the battery was subjected to charge/discharge cycle testing at a current density of 1 mA/cm$^2$. The charging operation was conducted at a constant potential of 4.2 V. After the charging operation, the potential between the electrodes was 4.2 V. The discharging operation was conducted at a constant current, and discontinued when the electric potential was decreased to 2.7 V. As a result of the charge/discharge testing, it was found that the discharge/charge efficiency (ratio) at the first cycle was 80% or more, and with respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to both sides of the electrolyte sheet. In this situation, after removing the current collectors from the battery, the electrolyte layer of the battery, together with the electrode layers, was washed with ethanol, followed by an extraction of the electrolytic liquid. Then, a major portion of each of the electrode layers on both surfaces of the electrolyte layer was scraped off, thereby obtaining a polymer sheet. Further, the obtained polymer sheet was dried to thereby obtain a sheet of dried polymer matrix. The degree of shrinkage of the porous polymer sheet after drying was 12% and the gel content of the dried polymer matrix was 64%.

COMPARATIVE EXAMPLE 1

From substantially the same porous polymer sheet as prepared in Example 1 was cut out a sample having a size of 4 cm×4 cm. Without subjecting the sample to irradiation, the sample was immersed in an electrolytic liquid which is substantially the same as prepared in Example 1, thereby obtaining an impregnated porous polymer sheet, and an excess electrolytic liquid on the surface of the obtained sheet was removed by wiping the surface of the sheet. The impregnated porous polymer sheet was sandwiched between two glass plates, followed by heating at 100° C. As a result of the heating, a sheet deformed into a circular shape was obtained. The gel content of the deformed sheet was 0%, as measured by the method described above.

In addition, using the impregnated porous polymer sheet obtained prior to the heating, a sheet battery was prepared in substantially the same manner as described in Example 1. The obtained sheet battery was subjected to a charging operation, and as a result, it was found that a short circuiting occurred, so that it was impossible to charge the sheet battery

EXAMPLE 2

A porous polymer sheet having a thickness of 25 $\mu$m and a void ratio of 73% was prepared in substantially the same manner as in Example 1, except that the thickness of the liquid film was 100 $\mu$m. Then, the prepared porous polymer sheet was irradiated with electron beams (irradiation dose: 15 Mrads) to thereby prepare a crosslinked porous polymer sheet.

The above-prepared crosslinked porous polymer sheet was immersed in substantially the same electrolytic liquid as that prepared in Example 1. When the crosslinked porous polymer sheet was immersed in the electrolytic liquid at room temperature, the sheet was immediately impregnated with the electrolytic liquid, and an impregnated transparent porous polymer sheet was obtained with ease. The electrolytic liquid on the surface of the impregnated porous polymer sheet (that is, an excess electrolytic liquid which did not impregnate the porous polymer sheet) was removed by wiping the porous polymer sheet. No change in the size of the impregnated porous polymer sheet was observed between the impregnated porous polymer sheet and the non-impregnated porous polymer sheet before the immersion in the electrolytic liquid. For the evaluation of the ionic conductivity of the impregnated porous polymer sheet, the impregnated porous polymer sheet was sandwiched between two stainless steel sheets, to thereby obtain a precursory electrochemical cell in which the impregnated porous polymer sheet is not swelled. The obtained precursory electrochemical cell was subjected to a measurement of an alternating-current impedance, using the above-mentioned two stainless sheets as electrodes. As a result, it was found that the ionic conductivity of the impregnated porous polymer sheet at room temperature was 0.25 mS/cm. The precursory electrochemical cell was heated at 100° C. for 1 hour, followed by cooling to room temperature, to thereby obtain an electrochemical cell composed of two electrodes and a hybrid electrolyte sheet (a swollen form of the impregnated porous polymer sheet). The resultant electrochemical cell was subjected to a measurement of an alternating-current impedance in substantially the same manner as described above. As a result, it was found that the ionic conductivity of the hybrid electrolyte sheet at room temperature was 1.1 mS/cm.

From the above-mentioned impregnated porous polymer sheet was cut out a sample having a size of 15 mm×15 mm, and then, the sample was sandwiched between two glass plates and heated at 100° C. in an oven for 1 hour. The change in the size of the sheet was 1 mm or less in the longitudinal direction of the sheet. The polymer sheet obtained after the heat treatment could be easily handled with forceps. On the other hand, when the crosslinked porous polymer sheet was immersed in the electrolytic liquid at 100° C. for 10 minutes, the size of the sheet increased from 1.5 cm×1.5 cm to 2 cm×2 cm. Thus, the above-mentioned temperature was confirmed to be a temperature at which the crosslinked porous polymer sheet can be swelled with the electrolytic liquid.

COMPARATIVE EXAMPLE 2

Using substantially the same non-crosslinked porous polymer sheet as prepared in Example 2, a precursory electrochemical call in which the impregnated porous polymer sheet is not swelled was obtained in substantially the same manner as in Example 2. The obtained precursory electrochemical cell was heated at 100° C. for 1 hour, followed by cooling to room temperature, to thereby obtain an electrochemical cell composed of two electrodes and a swollen, impregnated porous polymer sheet. Subsequently, the obtained electrochemical cell was subjected to a measurement of an alternating-current impedance. As a result, it was found that a short circuiting occurred. Furthermore, when the non-crosslinked porous polymer sheet was immersed in the electrolytic liquid at 90° C., the polymer sheet dissolved in 4 minutes.

EXAMPLE 3 AND COMPARATIVE EXAMPLE 3

From substantially the same $LicoO_2$ electrode sheet and needle coke electrode sheet as prepared as in Example 1 were individually cut out a sample having a size of 2 cm×2 cm. From substantially the same impregnated porous polymer sheet as prepared in Example 2 was cut out a sample having a size of 2.3 cm×2.3 cm, and the sample of the impregnated porous polymer sheet was sandwiched between the above-prepared electrode sheets so as to obtain a laminate structure, thereby preparing a battery composed of a negative electrode (needle cokes), an impregnated porous polymer sheet, and a positive electrode ($LiCoO_2$). Subsequently, stainless steel sheets (as electric terminals for taking a current) were brought into contact with the respective current collectors of the positive and negative electrodes of the battery. The battery was then placed in a sealable glass cell having electric terminals for taking a current from the battery (hereinafter frequently referred to simply as "glass cell"), and the electric terminals of the battery were connected to the electric terminals of the cell. The cell was sealed in an argon atmosphere to obtain a sheet battery Two sheet batteries were prepared as described above. One of the sheet batteries was heated at 100° C. for 2 hours, followed by cooling to room temperature (Example 3). The other sheet battery was used without being subjected to the heat-treatment (Comparative Example 3).

Both sheet batteries were individually subjected to a measurement of an alternating-current impedance and to charge/discharge cycle testing. As a result of the measurement of an alternating-current impedance, it was found that the internal resistance of the sheet battery of Comparative Example 3 was 80 Ω, whereas the internal resistance of the sheet battery of Example 3 was 30 Ω. Further, the two batteries were subjected to charge/discharge cycle testing in substantially the same manner as in Example 1. As a result of the charge/discharge cycle testing, it was found that the discharge/charge efficiency (ratio) at the first cycle of each battery was 80% or more, and with respect to the cycles after the first cycle, each of the discharge/charge efficiencies (ratio) at both batteries was 99% or more. These results show that both batteries are capable of being repeatedly charged and discharged and hence operable as a secondary battery. However, the overpotential of the battery of Example 3 was 50 mV, whereas the overpotential of the battery of Comparative Example 3 was 100 mV. Thus, the electric capacity of the sheet battery of Comparative Example 3 was low.

EXAMPLE 4

Substantially the sample crosslinked porous polymer sheet as prepared in Example 2 was sandwiched between substantially the same two electrode sheets as prepared in Example 1, to thereby prepare a laminate structure. The prepared laminate structure was immersed in an electrolytic liquid, which is substantially the same as that prepared in Example 1, at room temperature for 1 hour so that the laminate structure was impregnated with the electrolytic liquid, thereby preparing a battery. The electrolytic liquid on the surface of the battery was removed by wiping the battery. Subsequently, stainless steel sheets (as electric terminals for taking a current) were brought into contact with the respective current collectors of the positive and negative electrodes of the battery. The battery was then placed in a glass cell, and the electric terminals of the battery were connected to the electric terminals of the cell. The cell was sealed in an argon atmosphere to obtain a sheet battery. The obtained sheet battery was heated at 100° C. for 2 hours, followed by cooling to room temperature.

The resultant sheet battery was subjected to a measurement of an alternating-current impedance and to charge/discharge cycle testing in substantially the same manner as described in Example 3. As a result of the measurement of an alternating-current impedance, it was found that the internal resistance of the battery was 30 Ω. The charging operation was conducted at a constant potential of 4.2 V. After the charging operation, the potential between the electrodes was 4.2 V. The discharging operation was conducted at a constant current, and discontinued when the electric potential was decreased to 2.7 V. As a result of the charge/discharge cycle testing, it was found that the discharge/charge efficiency (ratio) at the first cycle was 80% or more, and with respect to the cycles after the first cycle, each of the discharge/charge efficiencies (ratio) was 99% or more. These results show that this battery is capable of being repeatedly charged and discharged and hence operable as a secondary battery The overpotential of the sheet battery was 30 mV.

EXAMPLE 5

A crosslinked porous polymer sheet was prepared in substantially the same manner as in Example 1, except that a vinylidene fluoride homopolymer resin (Kynar 460, manufactured and sold by Elf Atochem North America Inc., USA) was used instead of the hexafluoropropylene/vinylidene fluoride copolymer resin. The thickness of the prepared polymer sheet was 45 μm and the void ratio was 71%.

The above-prepared crosslinked porous polymer sheet was immersed in substantially the same electrolytic liquid as prepared in Example 1. When the crosslinked porous polymer sheet was immersed in the electrolytic liquid at room temperature, the sheet was impregnated with the electrolytic liquid and a transparent impregnated porous sheet was obtained. The change in the size of the impregnated porous polymer sheet was 3% in the longitudinal direction of the sheet, relative to the size of the non-impregnated porous polymer sheet. The impregnated porous polymer sheet was sandwiched between two glass plates and heated at 120° C. in an oven for 2 hours, to thereby prepare a hybrid electrolyte sheet. No change in the size of the impregnated porous polymer sheet was observed between the impregnated porous polymer sheet before the heat treatment and the hybrid electrolyte sheet obtained after the heat treatment. From the prepared hybrid electrolyte sheet was cut out a sample having a predetermined size, and the electrolytic liquid was removed by extraction, followed by drying, to thereby obtain a dried polymer matrix. The degree of shrinkage of the porous polymer sheet was 24%, as calculated from the size of the dried polymer matrix and the size of the hybrid electrolyte sheet, and the gel content of the polymer matrix was 69%. On the other hand, when the above-obtained crosslinked porous polymer sheet was immersed in the electrolytic liquid at 120° C. for 1 hour, the size of the porous polymer sheet increased by 40% in the longitudinal direction of the sheet, based on the size of the porous polymer sheet before the immersion in the electrolytic liquid. Thus, the above-mentioned temperature was confirmed to be a temperature at which the porous polymer sheet can be swelled with the electrolytic liquid. The ionic conductivity of the obtained hybrid electrolyte was 1.1 mS/cm at room temperature.

From each of substantially the same $LiCoO_2$ electrode sheet and needle coke electrode sheet as prepared in Example 1 was individually cut out a sample having a size of 4 cm×4 cm. The samples obtained were individually impregnated with substantially the same electrolyte liquid as prepared in Example 1, to thereby provide two impregnated electrode sheets. From the hybrid electrolyte sheet which had been separately prepared above was cut out a sample sheet of hybrid electrolyte having a size of 4.5 cm×4.5 cm, and the sample sheet of the hybrid electrolyte was sandwiched between the above-prepared electrode sheets so as to obtain a laminate structure, thereby preparing a battery composed of a negative electrode (needle cokes), an impregnated porous polymer sheet, and a positive electrode ($LiCoO_2$). The prepared battery was pressed at 120° C. for 1 minute. Stainless steel sheets (as electric terminals for taking a current) were brought into contact with the respective current collectors of the positive and negative electrodes of the resultant heat-pressed battery, and the battery was placed between two opposite PET/Al/PE laminate films (PET: polyethylene terephthalate film, Al: aluminum sheet, PE: polyethylene film) so that the current collectors project from the resultant structure. The laminate structure of the resultant structure was made secure by means of a laminator, to thereby obtain a sheet battery.

The sheet battery was subjected to charge/discharge cycle testing in substantially the same manner as described in Example 1. As a result of the charge/discharge cycle testing, it was found that the discharge/charge efficiency (ratio) at the first cycle was 80% and more, and with respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to both sides of the electrolyte sheet.

EXAMPLE 6

A crosslinked porous polymer sheet was prepared in substantially the same manner as in Example 1, except that a vinylidene fluoride homopolymer resin (Trade name: Kynar 740, manufactured and sold by Elf Atochem North America Inc., U.S.A.) was used instead of the hexafluoropropylene/vinylidene fluoride copolymer resin. The prepared crosslinked porous polymer sheet had a thickness of 60 μm and a void ratio of 77%. The crosslinked porous polymer sheet was immersed in an electrolytic liquid in substantially the same manner as in Example 1, to thereby obtain an impregnated transparent porous polymer sheet. The change in the size of the impregnated crosslinked porous polymer sheet was 3% in the longitudinal direction of the sheet. The impregnated porous polymer sheet was sandwiched between two glass plates and heated at 120° C. in an oven for 2 hours, to thereby obtain a hybrid electrolyte sheet. No change in the size of the impregnated porous polymer sheet was observed between the impregnated porous polymer sheet before the heat treatment and the hybrid electrolyte sheet obtained after the heat treatment. From the electrolyte sheet was cut out a sample having a predetermined size, and the electrolytic liquid was removed by extraction, followed by drying, to thereby obtain a dried polymer matrix The degree of shrinkage of the porous polymer sheet was 24%, as calculated from the size of the dried polymer matrix and the size of the hybrid electrolyte sheet, and the gel content of the polymer matrix was 40%. On the other hand, when the above-obtained crosslinked porous polymer sheet was immersed in the electrolytic liquid at 120° C. for 1 hour, the size of the crosslinked porous polymer sheet increased by 38% in the longitudinal direction of the sheet, based on the size of the porous polymer sheet before the immersion in the electrolytic liquid. Thus, the above-mentioned temperature was confirmed to be a temperature at which the porous polymer sheet can be swelled with the electrolytic liquid. The ionic conductivity of the hybrid electrolyte sheet at room temperature was 1.4 mS/cm.

Using the hybrid electrolyte sheet obtained above, a sheet battery was prepared in substantially the same manner as described in Example 5, and the prepared sheet battery was subjected to charge/discharge cycle testing. As a result of the charge/discharge cycle testing, it was found that the discharge/charge efficiency (ratio) at the first cycle was 80% or more, and with respect to the cycles after the first cycle, each of the discharge/charge efficiencies (ratio) was 99% or more. These results show that this battery is capable of being repeatedly charged and discharged and hence operable as a secondary battery After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to both sides of the electrolyte sheet.

COMPARATIVE EXAMPLE 4

Substantially the same crosslinked porous polymer sheet as used in Example 5, that is, the crosslinked porous polymer sheet used for confirming the conditions at which the porous polymer sheet can be swelled with the electrolytic liquid, was used for preparing a hybrid electrolyte sheet. The crosslinked porous polymer sheet was immersed in substantially the same electrolytic liquid as used in Example 5 at 120° C. for 1 hour, to thereby obtain a hybrid electrolyte sheet. From the obtained hybrid electrolyte sheet was cut out a sample having a predetermined size, and the electrolytic liquid was removed by extraction, followed by drying, to thereby obtain a dried polymer matrix. The degree of shrinkage of the porous polymer sheet was 36%, as calculated from the size of the dried polymer matrix and the size of the hybrid electrolyte sheet, and the gel content of the polymer matrix was 86%. The ionic conductivity of the hybrid electrolyte sheet at room temperature was 1.8 mS/cm.

Using the hybrid electrolyte sheet obtained above, a sheet battery was prepared in substantially the same manner as in Example 5, and the prepared sheet battery was subjected to charge/discharge cycle testing ten cycles. As a result of the change/discharge cycle testing, it was found that the charge/discharge efficiencies were unstable. After repeating the charge/discharge testing ten cycles, both of the two opposite PET/Al/PE laminate films were removed from the sheet battery, thereby isolating the battery. Then, the electrode sheets were removed from the isolated battery. Though some of the LiCO$_2$ particles or the needle coke particles remain on the surface of the electrolyte sheet, almost all of the electrode sheets were removed from the electrolyte sheet, thus demonstrating that the electrode sheets are inadequately attached to both sides of the electrolyte sheet.

EXAMPLE 7

A conventional porous membrane filter made from polyvinylidene fluoride resin (diameter: 0.22 $\mu$m, thickness: 125 $\mu$m, and a void ratio: 75%) (Durapore GVHP, manufactured and sold by MILLIPORE Japan, Japan) was irradiated with electron beams (irradiation dose: 30 Mrad) to thereby prepare a crosslinked porous polymer sheet. The resultant crosslinked porous polymer sheet was immersed in an electrolytic liquid in substantially the same manner as in Example 1. When the crosslinked porous polymer sheet was immersed in the electrolytic liquid, the sheet was immediately impregnated with the electrolytic liquid and an impregnated transparent porous polymer sheet was obtained. No change in the size of the impregnated porous polymer sheet was observed between the impregnated polymer sheet and the porous polymer sheet before the immersion in the electrolytic liquid. The impregnated porous polymer sheet was sandwiched between two glass plates and heated at 120° C. in an oven for 2 hours, to thereby obtain a hybrid electrolyte sheet. No change in the size of the impregnated porous polymer sheet was observed between the impregnated porous polymer sheet before the heat treatment and the hybrid electrolyte sheet obtained after the heat treatment. From the obtained hybrid electrolyte sheet was cut out a sample having a predetermined size, and the electrolytic liquid was removed by extraction, followed by drying, to thereby obtain a dried polymer matrix. The degree of shrinkage of the porous polymer sheet was 20%, as calculated from the size of the dried polymer matrix and the size of the hybrid electrolyte sheet, and the gel content of the polymer matrix was 72%. On the other hand, when the above-obtained crosslinked porous polymer sheet was immersed in the electrolytic liquid at 120° C. for 1 hour, the size of the crosslinked porous polymer sheet increased by 40% in the longitudinal direction of the sheet. Thus, the above-mentioned temperature was confirmed to be a temperature at which the crosslinked porous polymer sheet can be swelled with the electrolytic liquid. The ionic conductivity of the obtained hybrid electrolyte sheet at room temperature was 1.2 mS/cm.

Using the above-obtained hybrid electrolyte sheet, a sheet battery was prepared in substantially the same manner as in Example 5, and the obtained sheet battery was subjected to charge/discharge cycle testing. As a result of the charge/discharge cycle testing, it was found that the discharge/charge efficiency (ratio) at the first cycle was 80% or more, and with respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to both sides of the electrolyte sheet.

COMPARATIVE EXAMPLE 5

A mixture consisting of 2 parts by weight of a hexafluoropropylene/vinylidene fluoride copolymer resin (Trade name: KynarFlex 2801, manufactured and sold by Elf Atochem North America Inc., U.S.A.), 2 parts by weight of dibutyl phthalate and 10 parts by weight of acetone was prepared and heated at 50° C., to thereby melt the copolymer The resultant mixture was cast on a plate at a thickness of 0.5 mm and dried in air, thereby obtaining a liquid film having a thickness of 90$\mu$m. The obtained liquid film was subjected to extraction with ether, to thereby remove dibutyl phthalate contained in the film. The resultant film was dried to obtain a non-porous polymer sheet. The obtained non-porous polymer sheet was irradiated with electron beams (irradiation dose: 15 Mrad) to thereby obtain a crosslinked non-porous polymer sheet. The crosslinked non-porous polymer sheet was immersed in substantially the same electrolytic liquid as prepared in Example 1 at 50° C., thereby obtaining an electrolytic liquid-impregnated, swollen non-porous polymer sheet as hybrid electrolyte sheet. The change in the size of the swollen hybrid electrolyte sheet was 25% in the longitudinal direction of the sheet. The degree of shrinkage of the hybrid electrolyte sheet was 25%, as calculated from the size of the dried polymer matrix and the size of the hybrid electrolyte sheet, and the gel content of the polymer matrix was 55%. The ionic conductivity of the hybrid electrolyte sheet at room temperature was 0.3 mS/cm.

Using the hybrid electrolyte sheet obtained above, a sheet battery was prepared in substantially the same manner as described in Example 5, except that the hybrid electrolyte sheet and the electrode sheets were pressed against each other at 100° C. The prepared sheet battery was subjected to charge/discharge cycle testing ten cycles. As a result of the charge/discharge cycle testing, it was found that all of the discharge/charge efficiencies were low, and the discharge capacity at the tenth cycle was only 40% of that at the first cycle. These results show that the properties of this battery are insufficient to operate as a secondary battery.

EXAMPLE 8

Substantially the same crosslinked porous polymer sheet as prepared in Example 1 was placed in a petri dish preheated to 100° C. Substantially the same electrolytic liquid as prepared in Example 1 was heated to 100° C., and the heated electrolytic liquid was dropwise applied to the entire surface of the crosslinked porous polymer sheet in the petri dish until the white color of the crosslinked porous polymer sheet disappeared and the polymer sheet became transparent, thus impregnating the crosslinked porous polymer sheet with the electrolytic liquid. The impregnated porous polymer sheet was cooled to room temperature, thereby obtaining an electrolytic liquid-impregnated, swollen porous polymer sheet as a hybrid electrolyte sheet. The size of the hybrid electrolyte sheet increased by 30% in the longitudinal direction thereof, relative to the size of the porous polymer sheet as measured before the impregnating with the electrolytic liquid. This confirmed that the porous polymer sheet was swelled with the electrolytic liquid. From the obtained hybrid electrolyte sheet was cut out a sample having a predetermined size, and the electrolytic liquid was removed by extraction, followed by drying, to thereby obtain a dried polymer matrix. The degree of shrinkage of the porous polymer sheet was 36%, as calculated from the size of the dried polymer matrix and the size of the hybrid electrolyte sheet, and the gel content of the polymer matrix was 70%. The ionic conductivity of the hybrid electrolyte sheet was 1.6 mS/cm.

Using the hybrid electrolyte sheet obtained above, a sheet battery was prepared in substantially the same manner as described in Example 5, except that the hybrid polymeric electrolyte sheet and the electrode sheets were pressed against each other at 100° C. The prepared sheet battery was subjected to charge/discharge cycle testing. As a result of the charge/discharge cycle testing, it was found that the discharge/charge efficiency (ratio) at the first cycle was 80%, and with respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to the electrolyte sheet.

EXAMPLE 9

From substantially the same $LiCoO_2$ electrode sheet and needle coke electrode sheet as prepared in Example 1 were individually cut out a sample having a size of 4 cm×4 cm. From substantially the same crosslinked porous polymer sheet as prepared in Example 1 was cut out a sample having a size of 4.5 cm×4.5 cm, and the sample of the crosslinked porous polymer sheet was sandwiched between the above-prepared electrode sheets so as to obtain a laminate structure composed of a negative electrode (needle cokes), a porous polymer sheet, and a positive electrode ($LiCoO_2$). The obtained laminate structure was sandwiched between two glass plates and held by means of a clip. The sandwiched structure was heated to 100° C., and then, the heated, sandwiched structure was held with its one side edge directed upward Substantially the same electrolytic liquid as prepared in Example 1 was heated to 100° C., and the heated electrolytic liquid was dropwise applied to the side edge of the laminate structure held between the glass plates until an excess electrolytic liquid began to flow down from the structure, to thereby impregnate the crosslinked porous polymer sheet with the electrolytic liquid. Subsequently, the resultant laminate structure was cooled to room temperature, thereby obtaining a battery. The glass plates were removed from the obtained battery, and stainless sheets (as electric terminals for taking a current) were brought into contact with the respective current collectors of the positive and negative electrodes of the battery. The battery was placed between two opposite PET/AL/PE laminate films so that the ends of the current collectors project from the resultant structure. The laminate structure of the resultant structure was made secure by means of a laminator, to thereby obtain a sheet battery.

The obtained sheet battery was subjected to charge/discharge cycle testing in substantially the same manner as in Example 1. As a result of the charge/discharge cycle testing, the discharge/charge efficiency (ratio) at the first cycle was 80% or more. With respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to both sides of the electrolyte sheet. In this situation, after removing the current collectors from the battery, the electrolyte layer of the battery, together with the electrode layers, was washed with ethanol, followed by an extraction of the electrolytic liquid. Then, a major portion of each of the electrode layers on both surfaces of the electrolyte layer was scraped off, thereby obtaining a polymer sheet. Further, the obtained polymer sheet was dried to thereby obtain a sheet of dried polymer matrix. The degree of shrinkage of the porous polymer sheet after drying was 14% and the gel content of the dried polymer matrix was 65%.

EXAMPLES 10 AND 11

A solution consisting of 17 parts by weight of polyacrylonitrile and 83 parts by weight of dimethyl sulfoxide was prepared, and the prepared solution was cast on a glass plate at room temperature, thereby preparing a liquid film having a thickness of 100 $\mu$m. Immediately, the obtained liquid film was immersed in water at room temperature to thereby solidify the film, and then, the film was washed with water and alcohol, followed by drying, thereby obtaining a porous polymer sheet having a thickness of 95 $\mu$m, and a void ratio of 78% (Example 10).

The above-prepared solution was cast on a glass plate at 60° C., to thereby obtain a liquid film having a thickness of 100 $\mu$m. Immediately, the obtained liquid film was immersed in water at 70° C. to thereby solidify the film, and then, the film was washed with water and alcohol, followed by drying, thereby obtaining a porous polymer sheet having a thickness of 76 $\mu$m, and a void ratio of 81% (Example 11).

The above-obtained two different porous polymer sheets were irradiated with electron beams (irradiation dose: 30 Mrads) to thereby obtain crosslinked porous polymer sheets Each of the crosslinked porous polymer sheets was immersed in a mixed solvent of ethylene carbonate (EC) and propylene carbonate (PC) (EC/PC weight ratio=1/1); however, none of the porous polymer sheets dissolved in the mixed solvent, thus confirming that the porous polymers are crosslinked.

An electrolytic liquid was obtained by dissolving LiBF$_4$ into a mixed solvent of ethylene carbonate (EC) and propylene carbonate (PC)(EC/PC weight ratio=1/1, and LiBF$_4$ concentration: 1 mol/liter), and the crosslinked porous polymer sheets were individually immersed in the above-obtained electrolytic liquid at room temperature for 30 minutes, to thereby obtain impregnated transparent porous polymer sheets impregnated with the electrolytic liquid. The obtained impregnated porous polymer sheets of Examples 10 and 11 had thicknesses of 103 $\mu$m and 85 $\mu$m, respectively. With respect to the size of each impregnated porous polymer sheet, no change was observed between the impregnated porous polymer sheet and the non-impregnated porous polymer sheet. An excess electrolytic liquid on the surface of each impregnated porous polymer sheet was removed by wiping the porous polymer sheet. For the evaluation of the ionic conductivity of each of the impregnated porous polymer sheets, the impregnated porous polymer sheets were individually sandwiched between two stainless steel sheets (as electrodes), to thereby obtain precursory electrochemical cells in which the impregnated porous polymer sheets are not swelled. Each of the obtained precursory electrochemical cells was subjected to a measurement of an alternating current impedance. As a result, it was found that the impregnated porous polymer sheets of Examples 10 and 11 had an ionic conductivity at room temperature of 0.3 mS/cm and 0.4 mS/cm, respectively. The precursory electrochemical cells were individually heated at 100° C. for 1 hour and cooled to room temperature, to thereby obtain electrochemical cells each composed of two electrodes and a hybrid electrolyte sheet (a swollen form of the impregnated porous polymer sheet). Each of the resultant electrochemical cells was subjected to a measurement of an alternating current impedance in substantially the same manner as described above. As a result, it was found that the hybrid electrolyte sheets of Examples 10 and 11 had an ionic conductivity at room temperature of 1.2 mS/cm and 1.4 mS/cm, respectively. With respect to each of the electrochemical cells of Examples 10 and 11, no change in the size of the impregnated porous polymer sheets was observed between the impregnated porous polymer sheets before the heat treatment and the hybrid electrolyte sheets obtained after the heat treatment.

On the other hand, when the crosslinked porous polymer sheets were individually immersed in the above-prepared electrolytic liquid at 100° C. for 1 hour, transparent, electrolytic liquid-impregnated, swollen porous polymer sheets of Examples 10 and 11 were obtained. The surface area of the sheet obtained in Example 10 increased by 350% and the surface area of the sheet obtained in Example 11 increased by 290%, based on the surface area of the crosslinked porous polymer sheet before being swelled with the electrolytic liquid.

EXAMPLE 12

A solution consisting of 17 parts by weight of a hexafluoropropylene/vinylidene fluoride copolymer resin (trade name: Kynar Flex 2801, manufactured and sold by Elf Atochem North America Inc., U.S.A.), 15 parts by weight of polyvinylpyrrolidone (trade name: K-30, manufactured and sold by Tokyo Kasei Ltd., Japan) and 68 parts by weight of N-methylpyrrolidone was prepared, and the prepared solution was cast on a glass plate at 50° C., to thereby obtain a liquid film having a thickness of 200 $\mu$m. Immediately, the obtained liquid film was immersed in a mixed solvent of N-methylpyrrolidone and water (weight ratio: 75/25) at room temperature, to thereby solidify the film, and then, the film was washed with water and alcohol, followed by drying, thereby obtaining a porous polymer sheet having a thickness of 61 $\mu$m and a void ratio of 64%. Further, the obtained porous polymer sheet was irradiated with electron beams (irradiation dose: 10 Mrads), to thereby obtain a crosslinked porous polymer sheet.

The above-obtained crosslinked porous polymer sheet was immersed in substantially the same electrolytic liquid as prepared in Example 1. When the crosslinked porous polymer sheet was immersed in the electrolytic liquid at room temperature, the sheet was immediately impregnated with the electrolytic liquid, thereby obtaining an impregnated transparent porous polymer sheet. The obtained impregnated transparent porous polymer sheet was sandwiched between two glass plates, and heated at 100° C. in an oven for 2 hours, to thereby obtain a hybrid electrolyte sheet. No change in the size of the impregnated porous polymer sheet was observed between the impregnated porous polymer sheet before the heat treatment and the hybrid electrolyte sheet obtained after the heat treatment. From the electrolyte sheet was cut out a sample having a predetermined size, and the electrolytic liquid was removed by extraction, followed by drying, to thereby obtain a dried polymer matrix. The degree of shrinkage of the porous polymer sheet was 42%, as calculated from the size of the dried polymer matrix and the size of the hybrid electrolyte sheet, and the gel content of the polymer matrix was 58%. The ionic conductivity of the hybrid electrolyte sheet at room temperature was 1.3 mS/cm.

Using the hybrid electrolyte sheet obtained above, a sheet battery was prepared in substantially the same manner as described in Example 5, except that the hybrid electrolyte sheet and the electrode sheets were pressed against each other at 100° C. The prepared sheet battery was subjected to charge/discharge testing. As a result of the charge/discharge cycle testing, it was found that the discharge/charge efficiency (ratio) at the first cycle was 80% or more, and with respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery; however, only the current collectors (metal sheets) came off the battery, thus demonstrating that the electrode sheets are securely attached to both sides of the electrolyte sheet.

EXAMPLE 13

Substantially the same crosslinked porous polymer sheet and an electrolytic liquid as prepared in Example 10 were used to impregnate the crosslinked porous polymer sheet with the electrolytic liquid in substantially the same manner as in Example 10, to thereby obtain an impregnated porous polymer sheet The obtained impregnated porous polymer sheet was sandwiched between two glass plates and heated at 100° C. in an oven for 1 hour, to thereby obtain a hybrid electrolyte sheet. No change in the size of the impregnated porous polymer sheet was observed between the impregnated porous polymer sheet before the heat treatment and the hybrid electrolyte sheet obtained after the heat treatment. From the obtained hybrid electrolyte sheet was cut out a sample having a predetermined size, and the electrolytic liquid was removed by extraction, followed by drying, to thereby obtain a dried polymer matrix The degree of shrinkage of the porous polymer sheet was 50%, as calculated from the size of the dried polymer matrix and the size of the hybrid electrolyte sheet, and the gel content of the polymer matrix was 37%. The ionic conductivity of the hybrid electrolyte sheet at room temperature was 1.4 mS/cm.

Using the hybrid electrolyte sheet obtained above, a sheet battery was prepared in substantially the same manner as described in Example 5. The prepared sheet battery was subjected to charge/discharge cycle testing. As a result of the charge/discharge cycle testing, it was found that the discharge/charge efficiency (ratio) at the first cycle was 80% or more, and with respect to the cycles after the first cycle, each of the discharge/charge efficiencies (ratio) was 99% or more. These results show that this battery is capable of being repeatedly charged and discharged and hence operable as a secondary battery.

After repeating the charge/discharge testing ten cycles, both of the two opposite PET/Al/PE laminate films were removed from the sheet battery, thereby isolating the battery. An attempt was made to remove the electrode sheets from the isolated battery, but only the current collectors (metal sheets) came off the battery, thus demonstrating that the electrode sheets are securely attached to both sides of the electrolyte sheet.

INDUSTRIAL APPLICABILITY

The hybrid electrolyte of the present invention has a high ionic conductivity, an excellent stability under high temperature conditions and an excellent adherability to an electrode, so that the hybrid electrolyte of the present invention can be advantageously used as an electrolyte for various electrochemical devices, such as primary and secondary batteries (e.g., a lithium battery), a photoelectrochemical device and an electrochemical sensor. Further, by the method of the present invention, the hybrid electrolyte having the above-mentioned excellent properties and an electrochemical device comprising such a hybrid electrolyte can be surely and effectively produced.

What is claimed is:

1. A hybrid electrolyte comprising:
   a shaped porous polymer structure comprising a polymer matrix and a plurality of cells dispersed in said polymer matrix, said polymer matrix containing a crosslinked polymer segment and having a gel content in the range of from 20 to 75%, and
   an electrolytic liquid selected from the group consisting of a solution of an electrolyte in water or a non-aqueous solvent and a liquid electrolyte,
   wherein said shaped porous polymer structure is impregnated and swelled with said electrolytic liquid.

2. The hybrid electrolyte according to claim 1, wherein said polymer matrix has a gel content in the range of from 30 to 70% by weight.

3. The hybrid electrolyte according to claim 1, wherein said polymer matrix has a gel content in the range of from 35 to 65% by weight.

4. The hybrid electrolyte according to any one of claims 1 to 3, wherein said cells of said polymer matrix comprise open cells which form through-holes passing through said shaped porous polymer structure.

5. The hybrid electrolyte according to any one of claims 1 to 3, wherein said shaped porous polymer structure has a void ratio of from 30 to 95%.

6. The hybrid electrolyte according to any one of claims 1 to 3, which is in the form of a sheet having a thickness of from 1 to 500 μm.

7. The hybrid electrolyte according to any one of claims 1 to 3, wherein said polymer matrix comprises a vinylidene fluoride polymer or an acrylonitrile polymer.

8. The hybrid electrolyte according to any one of claims 1 to 3, wherein said crosslinked polymer segment has a crosslinked structure formed by electron beam irradiation or γ-ray irradiation.

9. The hybrid electrolyte according to claim 4, wherein said shaped porous polymer structure has a void ratio of from 30 to 95%.

10. The hybrid electrolyte according to claim 4, wherein said polymer matrix comprises a vinylidene fluoride polymer or an acrylonitrile polymer.

11. The hybrid electrolyte according to claim 5, wherein said polymer matrix comprises a vinylidene fluoride polymer or an acrylonitrile polymer.

12. The hybrid electrolyte according to claim 6, wherein said polymer matrix comprises a vinylidene fluoride polymer or an acrylonitrile polymer.

13. A method for producing a hybrid electrolyte, which comprises:
   impregnating a shaped porous polymer structure, which comprises a polymer matrix and a plurality of cells dispersed in said polymer matrix, wherein said polymer matrix contains a crosslinked polymer segment, with an electrolytic liquid selected from the group consisting of a solution of an electrolyte in water or a non-aqueous solvent and a liquid electrolyte under predetermined non-swelling temperature and pressure conditions at which said shaped porous polymer structure is substantially insusceptible to swelling with said electrolytic liquid, thereby obtaining an impregnated, shaped porous polymer structure;
   removing excess electrolytic liquid on said impregnated, shaped porous polymer structure; and
   holding the resultant impregnated, excess electrolytic liquid-removed, shaped porous polymer structure under predetermined swelling temperature and pressure conditions at which said shaped porous polymer structure is susceptible to swelling with said electrolytic liquid.

14. The method according to claim 13, wherein said cells of said polymer matrix comprise open cells which form through-holes passing through said shaped porous polymer structure.

15. The method according to claims 13 or 14, wherein said polymer matrix comprises a vinylidene fluoride polymer or an acrylonitrile polymer.

16. The method according to any one of claims 13 to 14, wherein said electrolytic liquid is selected from the group consisting of a solution of an electrolyte in a non-aqueous solvent and a liquid electrolyte.

17. A method for producing a hybrid electrolyte, which comprises:

impregnating a shaped porous polymer structure, which comprises a polymer matrix and a plurality of cells dispersed in said polymer matrix, wherein said polymer matrix comprises a vinylidene fluoride polymer or an acrylonitrile polymer and contains a crosslinked polymer segment, with an electrolytic liquid selected from the group consisting of a solution of an electrolyte in a non-aqueous solvent and a liquid electrolyte at a temperature of 35° C. or less under atmospheric pressure at which said shaped porous polymer structure is substantially insusceptible to swelling with said electrolytic liquid, thereby obtaining an impregnated, shaped porous polymer structure;

removing excess electrolytic liquid on said impregnated, shaped porous polymer structure; and heating the resultant impregnated, excess electrolytic liquid-removed, shaped porous polymer structure at a temperature of 80° C. or more under atmospheric pressure at which said shaped porous polymer structure is susceptible to swelling with said electrolytic liquid.

18. The method according to claim 17, wherein said cells of said polymer matrix comprise open cells which form through-holes passing through said shaped porous polymer structure.

19. The method according to claims 17 or 18, wherein said impregnated, shaped polymer structure is heated at a temperature of 90° C. or more.

20. A hybrid electrolyte which is substantially the same as that produced by the method of any one of claims 13 to 18.

21. A method for producing an electrochemical device, which comprises:

impregnating a shaped porous polymer structure, which comprises a polymer matrix and a plurality of cells dispersed in said polymer matrix, wherein said polymer matrix contains a crosslinked polymer segment, with an electrolytic liquid selected from the group consisting of a solution of an electrolyte in water or a non-aqueous solvent and a liquid electrolyte under predetermined non-swelling temperature and pressure conditions at which said shaped porous polymer structure is substantially insusceptible to swelling with said electrolytic liquid, thereby obtaining an impregnated, shaped porous polymer structure;

removing excess electrolytic liquid on said impregnated, shaped porous polymer structure;

laminating the resultant impregnated, excess electrolytic liquid-removed, shaped porous polymer structure to an electrode to thereby obtain a laminate structure; and holding said laminate structure under predetermined swelling temperature and pressure conditions at which said shaped porous polymer structure is susceptible to swelling with said electrolytic liquid.

22. The method according to claim 21, wherein said polymer matrix comprises a vinylidene fluoride polymer or an acrylonitrile polymer.

23. A method for producing an electrochemical device, which comprises:

impregnating a shaped porous polymer structure, which comprises a polymer matrix and a plurality of cells dispersed in said polymer matrix, wherein said polymer matrix comprises a vinylidene fluoride polymer or an acrylonitrile polymer and contains a crosslinked segments, with an electrolytic liquid selected from the group consisting of a solution of an electrolyte in a non-aqueous liquid and a liquid electrolyte at a temperature of 35° C. or less under atmospheric pressure at which said shaped porous polymer structure is substantially insusceptible to swelling with said electrolytic liquid, thereby obtaining an impregnated, shaped porous polymer structure;

removing excess electrolytic liquid on said impregnated, shaped porous polymer structure;

laminating the resultant impregnated, excess electrolytic liquid-removed, shaped porous polymer structure to an electrode to thereby obtain a laminate structure; and heating said laminate structure at a temperature of 80° C. or more under atmospheric pressure at which said shaped porous polymer structure is susceptible to swelling with said electrolytic liquid.

24. The method according to claim 23, wherein said laminate structure is heated at 90° C. or more.

25. A method for producing an electrochemical device, which comprises:

laminating a shaped porous polymer structure, which comprises a polymer matrix and a plurality of cells dispersed in said polymer matrix, wherein said polymer matrix contains a crosslinked polymer segment, to an electrode to thereby obtain a laminate structure;

impregnating said laminate structure with an electrolytic liquid selected from the group consisting of a solution of an electrolyte in water or a non-aqueous solvent and a liquid electrolyte under predetermined non-swelling temperature and pressure conditions at which said shaped porous polymer structure is substantially insusceptible to swelling with said electrolytic liquid, thereby obtaining an impregnated laminate structure;

removing excess electrolytic liquid on said impregnated laminate structure; and holding the resultant impregnated, excess electrolytic liquid-removed laminate structure under predetermined swelling temperature and pressure conditions at which said shaped porous polymer structure is susceptible to swelling with said electrolytic liquid.

26. The method according to claim 25, wherein said polymer matrix comprises a vinylidene fluoride polymer or an acrylonitrile polymer.

27. A method for producing an electrochemical device, which comprises:

laminating a shaped porous polymer structure, which comprises a polymer matrix and a plurality of cells dispersed in said polymer matrix, wherein said polymer matrix comprises a vinylidene fluoride polymer or an acrylonitrile polymer and contains a crosslinked polymer segment, to an electrode to thereby obtain a laminate structure;

impregnating said laminate structure with an electrolytic liquid selected from the group consisting of a solution of an electrolyte in a non-aqueous solvent and a liquid electrolyte at a temperature of 35° C. or less under atmospheric pressure at which said shaped porous polymer structure is substantially insusceptible to swelling with said electrolytic liquid, thereby obtaining an impregnated laminate structure;

removing excess electrolytic liquid on said impregnated laminate structure; and heating the resultant impregnated, excess electrolytic liquid-removed laminate structure at a temperature of 80° C. or more under atmospheric pressure at which said shaped porous polymer structure is susceptible to swelling with said electrolytic liquid.

28. The method according to claim 27, wherein said impregnated laminate structure is heated at a temperature of 90° C. or more.

29. The method according to any one of claims 21 to 28, wherein said electrochemical device is a battery comprising a positive electrode and a negative electrode.

30. The method according to claim 29, wherein said battery is a non-aqueous battery.

31. The method according to claim 30, wherein said battery is a lithium ion secondary battery.

32. The method according to any one of claims 21 to 28, wherein said electrochemical device has an electrode having a current collector and wherein said current collector is a mesh current collector.

33. An electrochemical device, which is substantially the same as that produced by the method of any one of claims 21 to 28.

* * * * *